(12) United States Patent
Spice

(10) Patent No.: US 12,087,139 B2
(45) Date of Patent: Sep. 10, 2024

(54) CONTACTLESS PAYMENT TERMINAL

(71) Applicant: Richard Spice, Dorking (GB)

(72) Inventor: Richard Spice, Dorking (GB)

( * ) Notice: Subject to any disclaimer, the term of this patent is extended or adjusted under 35 U.S.C. 154(b) by 1029 days.

(21) Appl. No.: 16/986,710

(22) Filed: Aug. 6, 2020

(65) Prior Publication Data

US 2020/0364967 A1    Nov. 19, 2020

Related U.S. Application Data

(63) Continuation-in-part of application No. 15/566,738, filed as application No. PCT/GB2016/051061 on Apr. 15, 2016, now Pat. No. 10,740,741.

(30) Foreign Application Priority Data

Apr. 15, 2015    (GB) ...................................... 1506390

(51) Int. Cl.
| | |
|---|---|
| G06Q 20/00 | (2012.01) |
| G06F 3/01 | (2006.01) |
| G06Q 20/32 | (2012.01) |
| G06Q 20/34 | (2012.01) |
| G06Q 30/0282 | (2023.01) |
| G07F 7/08 | (2006.01) |

(52) U.S. Cl.
CPC ............ *G07F 7/0893* (2013.01); *G06F 3/017* (2013.01); *G06Q 20/3278* (2013.01); *G06Q 20/352* (2013.01); *G06Q 30/0282* (2013.01)

(58) Field of Classification Search
CPC ............. G06Q 20/3278; G06Q 20/352; G06Q 30/0282
See application file for complete search history.

(56) References Cited

U.S. PATENT DOCUMENTS

2015/0370469 A1* 12/2015 Leong .................. G06F 3/0482
715/771

FOREIGN PATENT DOCUMENTS

WO    WO-2013028646 A2 *    2/2013    ......... G06Q 20/3278

* cited by examiner

*Primary Examiner* — Rokib Masud
(74) *Attorney, Agent, or Firm* — Ziegler IP Law Group LLC.

(57) ABSTRACT

A contactless payment transceiver with a display; a non-contact user input device configured for detecting a gesture of a user corresponding to a select input, a gesture of a user corresponding to an increase input and a gesture of a user corresponding to decrease input. The apparatus is configured to display an initial numerical value on the display; respond to detecting the gesture corresponding to the increase input by incrementing the numerical value displayed; respond to detecting the gesture corresponding to the decrease input by decrementing the numerical value displayed; respond to detecting the gesture corresponding to the select input by setting a transaction amount that corresponds to the numerical value displayed at the time of detection of the gesture corresponding to the select input; and use the contactless payment transceiver to initiate execution of a transaction for the transaction amount with a contactless payment token.

20 Claims, 17 Drawing Sheets

| Terminal state | 1 (Off) | 2 (Standby) | 3 (Payment) | 4 (End) |
|---|---|---|---|---|
| Terminal user interface | OFF | ON | ON | ON |
| Short distance contactless RF interface | OFF | OFF | ON | OFF |

CONTACTLESS PAYMENT TERMINAL

FIELD OF THE DISCLOSURE

The present disclosure generally relates to a mobile contactless payment terminal and a method of operating a mobile contactless payment terminal.

BACKGROUND OF THE DISCLOSURE

Contactless payment is a convenient and secure method for consumers to make payment transactions for goods and services. Such payment transactions are becoming increasingly common. Currently in the UK there is a spending cap when using contactless payment cards (credit and debit cards) to make payments, primarily for security reasons such as to prevent fraudulent usage. The spending cap limit was recently increased to £45 from £30 and future further increases are likely. Some mobile payment services (including Apple Pay and Google Pay) have higher limits or no limit at all.

Contactless payments can be made using a variety of contactless payment devices. Typically, debit or credit cards issued by banks or building societies come equipped with contactless payment chips (integrated circuits) to facilitate contactless payments. Other means of making contactless payments are also becoming increasingly common such contactless payment devices like key fobs, smartcards, smart watches, mobile phones and tablet computers. Mobile phones and tablets must have the correct hardware and software such that they can be configured to make contactless payments. Contactless payment devices include wireless transceivers.

In a typical merchant transaction, for example at a restaurant, a customer receives a bill at the end of a meal and submits a form of payment. Tips and gratuities are often incorporated into the main bill at the customer's discretion and paid in cash or with a payment card. Certain retailers have payment terminals which allow the customer to add tips and gratuities to the main bill when making a card payment. Typically, when making a payment, a payment terminal is presented to the customer comprising a keypad to allow the user to enter desired tip and gratuities and to confirm the payment transaction. When the desired amount has been confirmed, the customer can then proceed to make a payment using a PIN number entered into the keypad for authentication. Some payment terminals however do not offer such a feature and tips and gratuities must then be paid separately, which is usually possible only using cash.

Furthermore, outside of the retail environment, for instance when interacting with charitable organisations, donors are often presented with a number of means to donate money. Typically, charitable organisations accept donations in cash, debit or credit card donations over the phone, text donations, internet donations or contactless donations as well. For contactless donations, donors may be given the option to donate a pre-set amount of, for instance, £3, £5 or £10. For charity personnel collecting donations on behalf of charity organisations in public areas, often, a donor is only presented with the option to pay by cash only.

There is an increasing desire for transactions made in public areas and retail environments alike to be entirely contactless, such that a customer or donor may both specify an amount to pay and complete the payment without any contact with a device. This allows for more hygienic transactions, since the transactions can be made easily while users avoid contact with frequently touched surfaces. This is useful for preventing the spread of infectious disease.

WO2012/154902 and US2007/046655 disclose parking meters with user interfaces by which a user can set a price to pay using up and down inputs. The possible payment amounts in these devices are limited to a small number of options. For some other reasons also they are not well-suited to service tipping and charity donation applications.

SUMMARY OF THE DISCLOSURE

A first aspect of the disclosure provides apparatus comprising:
  a contactless payment transceiver;
  a display;
  a non-contact user input device configured for detecting a gesture of a user corresponding to a select input, a gesture of a user corresponding to an increase input and a gesture of a user corresponding to decrease input;
  a processor arrangement; and
  a non-transient memory storing computer code which when executed by the processor arrangement causes the apparatus to:
    display an initial numerical value on the display;
    respond to detecting the gesture corresponding to the increase input by incrementing the numerical value displayed on the display;
    respond to detecting the gesture corresponding to the decrease input by decrementing the numerical value displayed on the display;
    respond to detecting the gesture corresponding to the select input by setting a transaction amount that corresponds to the numerical value displayed on the display at the time of detection of the gesture corresponding to the select input; and
    use the contactless payment transceiver to initiate execution of a transaction for the transaction amount with a contactless payment token.

In some embodiments, the non-contact user input device comprises a radar sensor.

In some embodiments, the radar sensor is a Frequency Modulated Continuous Wave (FMCW) radar sensor.

In some embodiments, the radar sensor is a Direct-Sequence Spread Spectrum (DSSS) radar sensor.

In some embodiments, the gesture corresponding to the increase input comprises a gesture of a user rotating a hand in a first direction. In some embodiments, the gesture corresponding to the decrease input comprises a gesture of the user rotating the hand in a second direction opposite to the first direction.

In some embodiments, the gesture corresponding to the select input comprises a gesture of the user gripping the hand with a thumb of the hand extended.

In some embodiments, the memory stores computer code which when executed by the processor arrangement causes the apparatus to: respond to detecting a gesture corresponding to a cancellation input by cancelling the transaction without initiating execution of a transaction for the transaction amount with a contactless payment token. In some embodiments, the gesture corresponding to the decrease input comprises a gesture of the user holding an open palm of the hand towards the apparatus.

In some embodiments, In some embodiments, the memory stores computer code which when executed by the processor arrangement causes the apparatus to:
  display an indicator that the transaction is complete.

In some embodiments, the memory stores computer code which when executed by the processor arrangement causes the apparatus to:
  enter standby mode following completion of a transaction, and
  respond to detection by the non-contact user input device of the presence of a user by exiting standby mode.

In some embodiments, the memory stores computer code which when executed by the processor arrangement causes the apparatus to:
  provide a user interface allowing a user to enter a rating or review.

In some embodiments, the memory stores computer code which when executed by the processor arrangement causes the apparatus to:
  provide the user interface allowing the user to enter the rating or review to a platform with which the payment card is registered.

In some embodiments, the memory stores computer code which when executed by the processor arrangement causes the apparatus to:
  provide the user interface allowing the user to enter the rating or review in response to reading the contactless payment token.

In some embodiments, the memory stores computer code which when executed by the processor arrangement causes the apparatus to:
  determine whether the contactless payment token is linked to a review platform or a merchant in response to reading the contactless payment token.

In some embodiments, the memory stores computer code which when executed by the processor arrangement causes the apparatus to:
  adjust a displayed rating in response to detecting a rating change gesture using the non-contact user input device.

In some embodiments, the memory stores computer code which when executed by the processor arrangement causes the apparatus to:
  display an indication that the selected review rating has been confirmed in response to detecting a rating confirmation gesture using the non-contact user input device.

In some embodiments, the memory stores computer code which when executed by the processor arrangement causes the apparatus to:
  after completing a transaction, display a machine-readable code, barcode or QR code linking the user to a review webpage.

A second aspect of the disclosure provides a method comprising:
  displaying an initial numerical value on a display;
  responding to a non-contact user input device detecting a gesture corresponding to an increase input by incrementing the numerical value displayed on the display;
  responding to the non-contact user input device detecting a gesture corresponding to the decrease input by decrementing the numerical value displayed on the display;
  responding to the non-contact user input device detecting a gesture corresponding to a select input by setting a transaction amount that corresponds to the numerical value displayed on the display at the time of detection of the gesture corresponding to the select input; and
  using a contactless payment transceiver, initiating execution of a transaction for the transaction amount with a contactless payment token.

A third aspect of the disclosure provides a payment terminal comprising,
  a contactless payment transceiver;
  a display; and
  user input apparatus comprising a select input, an increase input and a decrease input,
  wherein the payment terminal is configured to
    display an initial numerical value;
    respond to detecting user operation of the increase input by incrementing the numerical value displayed on the display;
    respond to detecting user operation of the decrease input by decrementing the numerical value displayed on the display;
    respond to detection of user operation of the select input by setting a transaction amount that corresponds to the numerical value displayed on the display at the time of detection of user operation of the select input; and
    use the contactless payment transceiver to initiate execution of a transaction for the transaction amount with a contactless payment token.

The user input apparatus may comprise an input device having an aspect that can be moved by a user to positions either side of a zero position, and wherein the increase input and the decrease input comprise means for detecting deflection of the aspect from the zero position in different directions respectively.

The aspect of the input device may be mechanically biased to the zero position such that the aspect of the input device returns to the zero position in the absence of applied force.

The payment terminal may be configured to control the rate of incrementing and decrementing the numerical value depending on a detected amount of deflection of the aspect of the input device from the zero position.

The input device may comprise a dial device that can be rotated by a user in clockwise and anticlockwise directions around a zero position, and wherein the increase input and the decrease input comprise means for detecting deflection of the dial from the zero position in different directions respectively.

The increase input may comprise means for detecting deflection of the dial from the zero position in the clockwise direction and the decrease input comprises means for detecting deflection of the dial from the zero position in the anticlockwise direction.

The select input may comprise means for detecting displacement of the dial in a direction that is substantially perpendicular to the plane of rotation of the dial.

The dial device may have a textured outer surface.

The dial device may have a rubberised outer surface.

The aspect may comprise a slider that can be moved by a user to positions either side of the zero position, and wherein the increase input and the decrease input comprise means for detecting deflection of the slider from the zero position in different directions respectively.

The increase input and the decrease input may comprise touch-sensitive switches.

The increase input and the decrease input may comprise push-operated electrical switches.

The fourth aspect of the disclosure provides a method of operating a payment terminal,
  the payment terminal comprising: a contactless payment transceiver; a display; and user input apparatus comprising a select input, an increase input and a decrease input, wherein the method comprises:
displaying an initial numerical value;
responding to detecting user operation of the increase input by incrementing the numerical value displayed on the display;
responding to detecting user operation of the decrease input by decrementing the numerical value displayed on the display;
responding to detection of user operation of the select input by setting a transaction amount that corresponds to the numerical value displayed on the display at the time of detection of user operation of the select input; and
using the contactless payment transceiver to initiate execution of a transaction for the transaction amount with a contactless payment token.

A fifth aspect of the disclosure provides a payment terminal comprising:
a contactless payment transceiver;
a display; and
user input apparatus comprising a select input, an increase input and a decrease input,
wherein the payment terminal is configured to:
display an initial numerical value;
respond to detecting user operation of the increase input by incrementing the numerical value displayed on the display;
respond to detecting user operation of the decrease input by decrementing the numerical value displayed on the display;
respond to detection of user operation of the select input by setting a transaction amount that corresponds to the numerical value displayed on the display at the time of detection of user operation of the select input; and
use the contactless payment transceiver to initiate execution of a transaction for the transaction amount with a contactless payment token, wherein the user input apparatus comprises an input device having an aspect that can be moved by a user to positions either side of a zero position and is mechanically biased to the zero position such that the aspect of the input device returns to the zero position in the absence of applied force, and wherein the payment terminal is configured to control the rate of incrementing and decrementing the numerical value depending on a detected amount of deflection of the aspect of the input device from the zero position.

BRIEF DESCRIPTION OF THE FIGURES

In the Figures:
FIG. 11 is a table showing different operating states of the FIG. 4 mobile payment terminal.

DETAILED DESCRIPTION OF SOME EMBODIMENTS OF THE DISCLOSURE

Figure 1:
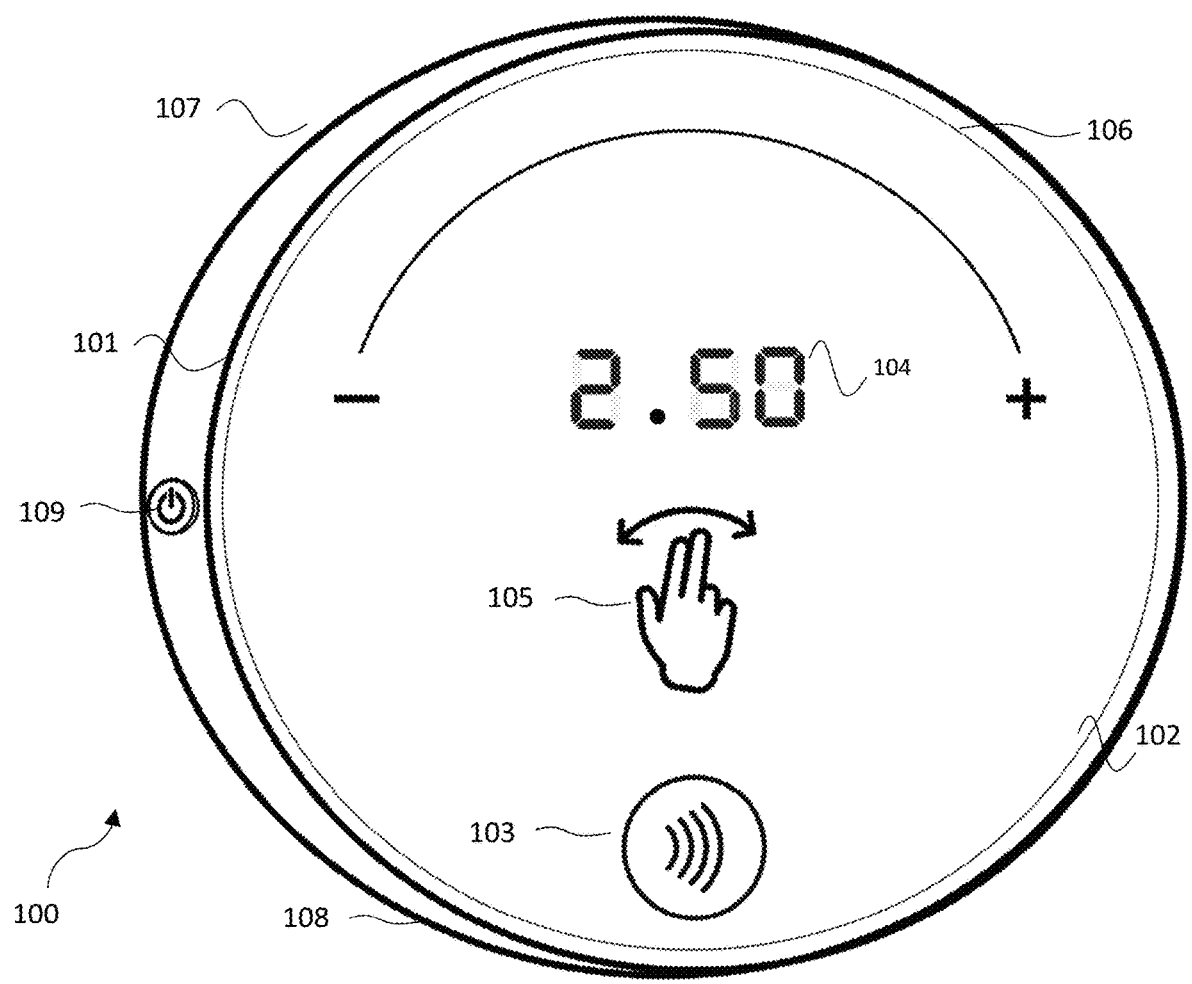
FIG. 1 is an isometric view of a mobile payment terminal according to embodiments of the present disclosure.

In the following, embodiments of the present disclosure will be described with reference to a mobile payment terminal 100 being used in a retail environment, for instance a restaurant for accepting tips or gratuities and for making charity donations. The present disclosure is however not limited to such applications and may be equally deployed in other environments that permit contactless payment to be made.

In brief, this specification discloses a mobile payment terminal for use in making quick and convenient contactless payments or charity donations, whereby the payer can quickly and easily select a desired payment amount before making a contactless payment. This is a new class of payment terminal that does not have correspondence at present.

Increasingly, consumers are choosing to pay for goods or services such as meal deliveries, taxi or minicab fares etc. online, using mobile apps, through websites, or over the phone. This often results in payments being made for the goods or services prior to their delivery. As such, upon delivery of the goods or services, the consumer wishing to tip the vendor may only do so by cash, if cash tipping is an option. This tipping option can pose inconvenience to the consumer as he or she may not always have (the right amount of) cash readily at hand. The new mobile payment terminal can be deployed in this case to allow the consumer an alternative means of tipping the deliverer of the goods or services.

For example, the payment terminal may be deployed in a food/beverage environment for instance a restaurant or café on each serving table to allow a customer an alternative means to quickly and conveniently make tips and gratuities payments for an amount of his or her choice using a contactless payment device or token. The mobile payment terminal can also be deployed by charitable organisations to enable donors to make a donation for an amount of their choice using contactless payment.

The payment facility provided by the mobile payment terminal is "quick" in that the actual payment transaction is simple and intuitive, requiring minimum user interaction. The mobile payment terminal enables a transaction to be completely contactless, with no need for the payee or payment recipient to have contact with a device when selecting a payment amount, confirming or cancelling the transaction and making a payment. It also allows payments to be made through optically clear screens, for example a window or protective screen.

The mobile payment terminal may comprise means for determining gestures made by a user in the vicinity of the mobile payment terminal, a contactless payment interface, and optionally, a scrollable dial to allow the user to set a desired payment amount.

No keypad or other complicated control interface is necessary. The payment service provided is also "convenient" in that the mobile payment terminals are designed specifically for large scale deployment and are hence easily assessable to consumers in public spaces where payment transactions such as tipping and donations often take place.

In a first group of embodiments, the mobile payment terminal comprises means for detecting a gesture made by a user and a very simple user interface comprising only a display for displaying information to the user and a contactless payment interface. Another advantage of the mobile payment terminal is that it is a standalone and self-contained device that is readily portable. This feature is particularly useful in a retail environment such as a restaurant where the mobile payment terminal may be moved from table to table. The mobile payment terminal can also support multiple terminal usage. For instance, a busy restaurant may have several customers wanting to make payment at the same time. In this situation, a number of mobile payment terminals can be deployed at the same time within the same vicinity to carry out these payment transactions. The mobility and multiple usage functions of the mobile payment terminal are also particularly advantageous when deployed by personnel representing charitable organisations collect donations in public places.

The mobile payment terminal allows transactions to be made entirely with gestures facilitating transactions that are completely contactless, not only with contactless payment but also contactless designation of an amount to pay, preventing the need for a user to touch the device at any point in the transaction. Avoiding contact with devices, especially those deployed in public spaces is desirable for hygiene and health. The use of gestures may also be beneficial for users with disabilities or health conditions which cause difficulty in transactions involving touch.

FIG. 1 is a view of a mobile payment terminal 100 according to example embodiments of the present disclosure. The mobile payment terminal 100 comprises a circular main housing 101 and a supporting base 108. The circular main housing 101 comprises a top facing portion 106 and a bottom facing portion 107. The top facing portion 106 of the circular main housing 101 comprises a terminal display interface 102 and a short distance contactless radio frequency interface 103.

The mobile payment terminal 100 comprises a display 104, such as an LCD or OLED display, on the terminal display interface 102 for displaying information such as user instructions 105. The mobile payment terminal further comprises a payment transceiver, such as an RFID or NFC transceiver, for gathering information from a contactless payment token, via the short distance contactless radio frequency interface 103.

The mobile payment terminal 100 may further comprise at least one user input means 109, for instance a terminal "power on" push button, illustrated schematically as a button type switch.

The mobile payment terminal also comprises means (not visible in the figure) to detect gestures made by a user. In some embodiments the means to detect gestures is a solid state, low power radar component, module or chip.

Specifically, the means to detect gestures is configured to detect movement of a body part (a hand for instance) through detecting reflections from the body part of a high frequency radio emission. The low power radar component, module or chip is configured to transmit low power radar signal and to detect radar signals from the environment. By detecting reflections of the signal that it transmitted after they have been reflected by and scattered by the body part, the position, shape and movement of the body part can be detected. The low power radar component, module or chip is particularly capable of detecting changes in position, shape and movement of body parts, and thus the low power radar component, module or chip can be configured to recognise gestures performed by a user.

The low power radar component, module or chip may for instance be a Xensiv 60 GHz radar sensor chip manufactured by Infineon. This chip is able to track motion in the sub-millimetre range accurately and at high speed.

The low power radar component, module or chip may use Frequency Modulated Continuous Wave (FMCW) radar technologies and/or it may use Direct-Sequence Spread Spectrum (DSSS) radar technologies.

Gesture detection using the low power radar component, module or chip may be performed using a machine-learned model, for instance. As an example, gesture recognition may be executed as described in Hand Gesture Recognition Using a Radar Echo I-Q Plot and a Convolutional Neural Network by Sakamoto et al in IEEE Sensors Letters VOL. 2, NO. 3, September 2018, the contents of which are incorporated herein by reference.

The mobile payment terminal 100 is portable. It can be operated in any orientation such that it may face the user, wherever they are. It can be operated in a horizontal position as in FIG. 1 such that the top facing portion 106 of the circular main housing 101 is facing upwards or in a vertical position such that the top facing portion 106 of the circular main housing 101 is facing sideways. Alternatively, the mobile payment terminal 100 may be affixed to a flat surface using temporary means, for instance with strong magnets, located at the bottom facing portion 107 of the mobile payment terminal 100. Alternatively, the mobile payment terminal 100 may also be affixed to a substantially flat surface using more permanent means such as screws and/or hooks.

The mobile payment terminal 100 may also comprise means for charging a device battery or means for otherwise powering the device. In some examples, the mobile payment terminal comprises one or more ports for charging or directly powering the device from an external power source, for example USB, micro-USB and USB-C port or ports. The mobile payment terminal may also charge the device battery by utilising photovoltaic cells, wireless charging or background RF harvesting.

Figure 2:
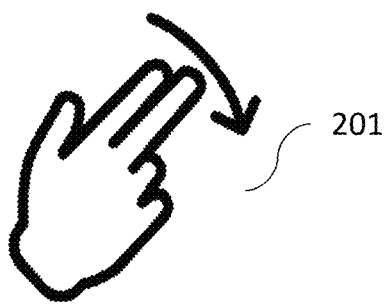
FIG. 2 shows a number of gestures that may be detected by the mobile payment terminal.
Figure 2:
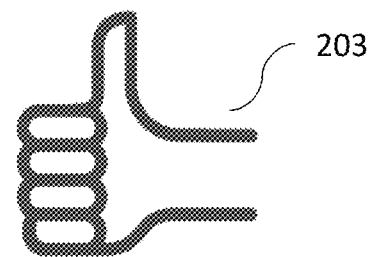
Figure 2:
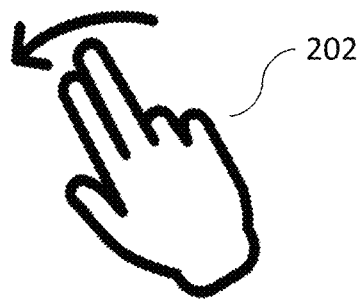
Figure 2:
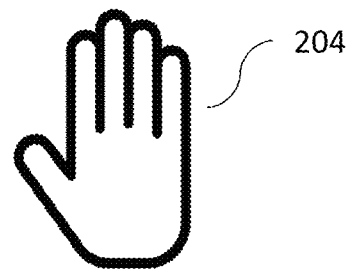

FIG. 2 depicts example illustrations of detectable gestures corresponding to a user input of the mobile payment terminal 100. The mobile payment terminal may detect gestures corresponding to the output of changing a value during a transaction to allow a user to select a payment or donation value. A change value gesture may comprise rotating a hand with one or more outstretched fingers about an axis perpendicular to the palm from a determined starting position. A different output is provided depending on the direction of rotation, i.e., rotating a hand with one or more outstretched fingers clockwise about the axis 201 may result in a value being incremented and rotating a hand with one or more outstretched fingers anti-clockwise about the axis 202 may result in a value being decremented. The output is dependent on the amount of deflection from the detected starting position. Thus, the extent of deflection in the user's gesture, as well as the direction of rotation, is detected and used in the changing of the payment or donation value.

The change value gesture may also be associated with an output to change the transaction value in predetermined increments. For example, detection of a change value gesture may comprise detection of a swipe of a hand or finger to change the transaction amount. A swipe from left to right may correspond to an output increasing the transaction amount by a predetermined value. A swipe from left to right may correspond to an output decreasing the transaction amount by a predetermined value. The predetermined increment may change depending on the current transaction amount. For example, between £0 and £1, each gesture may cause the transaction amount to increase by 10p, between £1-2 by 20p and so on. The set increment may also be dependent on the detected gesture itself. For example, a swipe from left the right covering a small distance may result in an output causing the transaction amount to change by 10p, a swipe from left the right covering a larger distance may result in an output causing the transaction amount to change by 50p.

The mobile payment terminal may detect gestures corresponding to a confirmation output. A confirmation gesture may comprise holding a hand out in a 'thumbs up' position 203. The mobile payment terminal may detect a hand held up in the 'thumbs up' position and after a predetermined time of detecting the hand making the gesture, providing an output, for example, to confirm the payment amount shown on the screen.

The mobile payment terminal may also detect gestures corresponding to a cancel transaction output. A cancel transaction gesture may comprise holding a hand up with the palm facing the terminal and all fingers extended 204. The mobile payment terminal may detect a hand with the palm facing the terminal and all fingers extended and after a predetermined time of detecting the hand making the gesture, providing an output, for example, to cancel current transaction.

Figure 3:
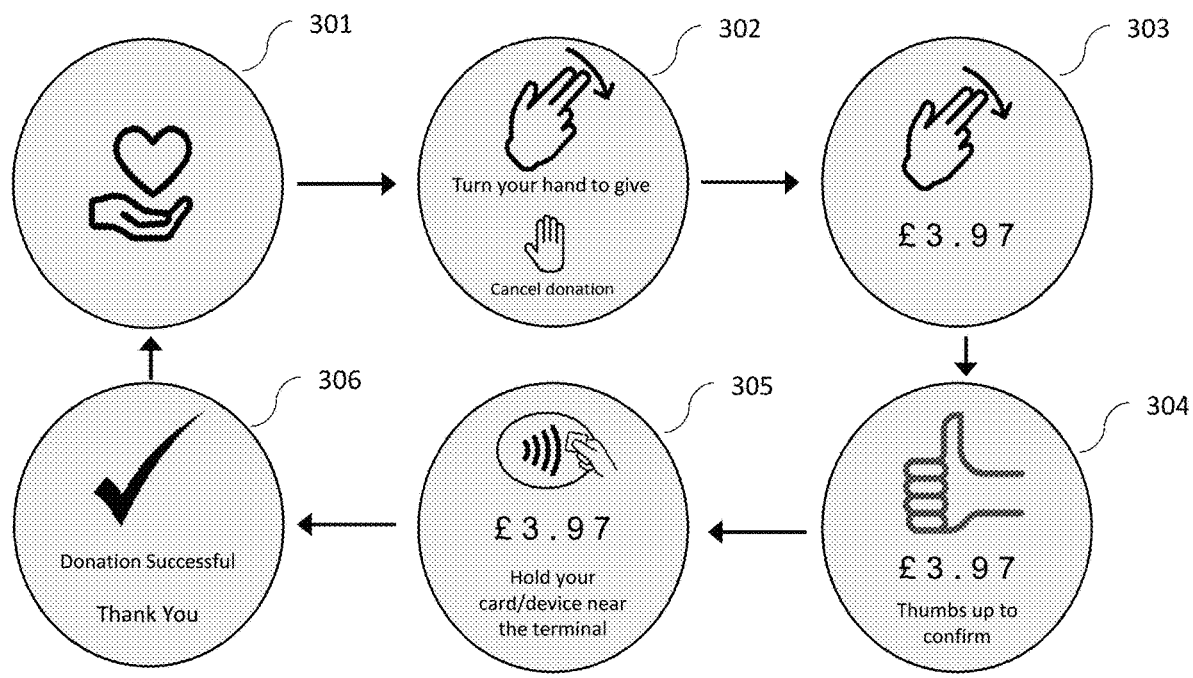
FIG. 3 is a view of the mobile payment terminal display throughout an example transaction.

FIG. 3 depicts the display of the mobile payment terminal from the start to finish of an example transaction. At 301 the terminal is in a low power standby mode. In this mode an image or logo may be displayed, for example, the logo of a charity which is asking for donations. Once movement is detected by the low power radar component, module or chip, the mobile payment terminal initiates a transaction. At this stage 302 the mobile payment terminal displays one or more user instructions with corresponding gesture logos and/or instructional gesture animations. Upon detecting a gesture to change the payment amount, the payment amount is displayed as it changes 303. If the payment amount remains constant for a predetermined elapsed time, the terminal displays a user instruction with a corresponding gesture logo and/or animation instructing the user to confirm the payment amount. At 305, after confirmation of the payment amount, the terminal display shows user instructions with a corresponding gesture logo and/or animation indicating that the user is able to pay via the short distance contactless radio frequency interface 103. Upon completion of a successful transaction via the short distance contactless radio frequency interface 103 the terminal displays an indicator that the transaction has been successful 306. After a predetermined time the terminal may enter the standby mode 301 again.

In a second group of embodiments, the user interface of the mobile payment terminal additionally comprises a scrollable dial for setting a desired payment amount.

Figure 4:
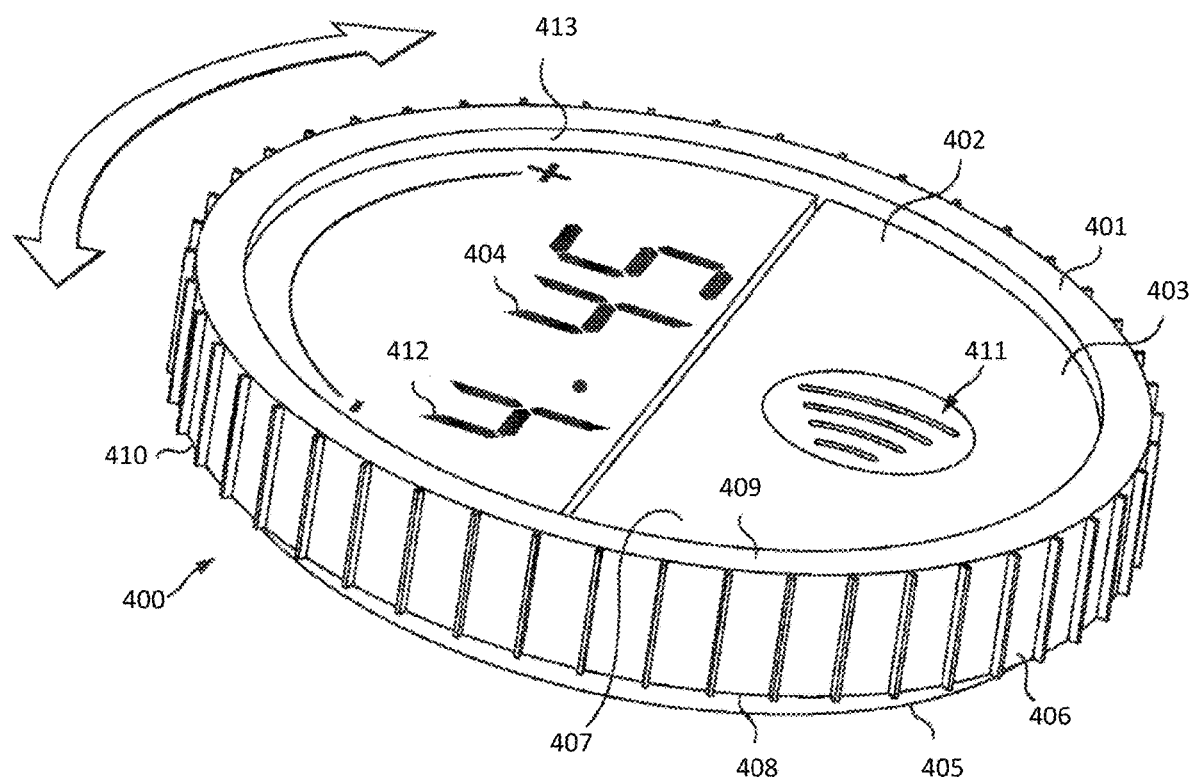
FIG. 4 is an isometric view of another mobile payment terminal according to embodiments of the present disclosure.
Figure 5:
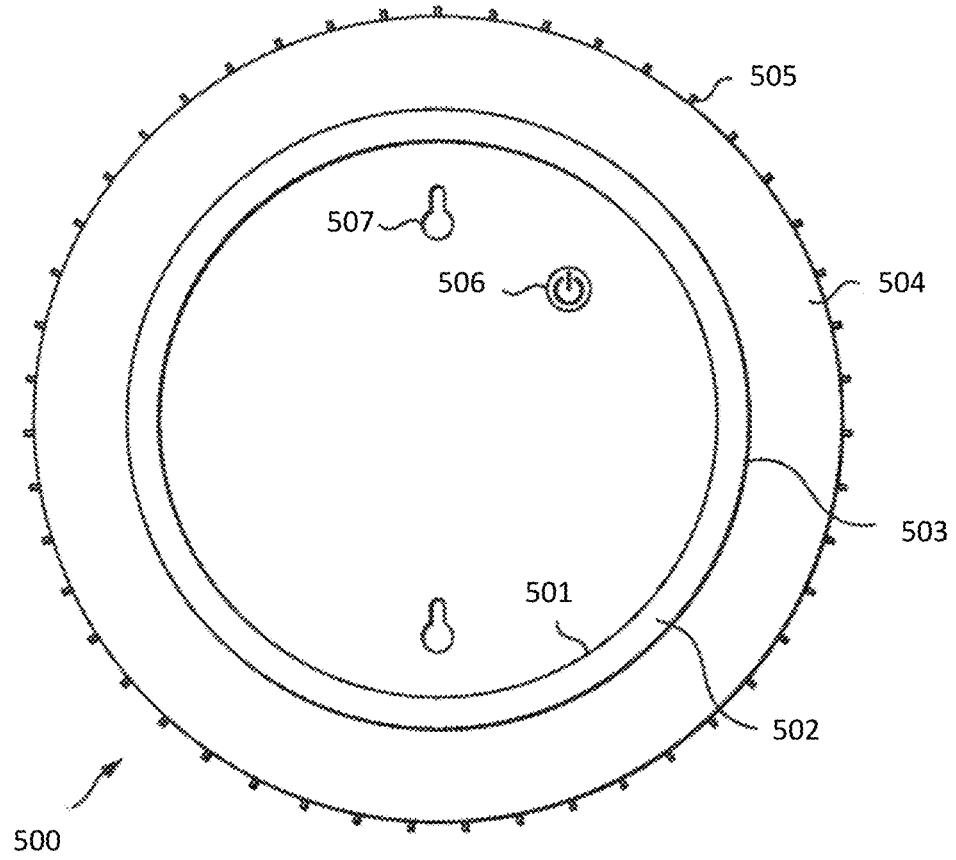
FIG. 5 is a bottom view of the FIG. 1 mobile payment terminal or the FIG. 4 payment terminal.

FIGS. 4 and 5 are views of a mobile payment terminal 400 according to example embodiments of the second group of embodiments of the present disclosure. The mobile payment terminal 400 comprises a circular main housing 402, a scrollable dial 401 and a supporting base 405. The circular main housing 402 comprises a top facing portion 407 and a bottom facing portion 408. The top facing portion 407 of the circular main housing 402 comprises two sections; a first section comprising a terminal display interface 404, and a second section comprising a short distance contactless radio frequency interface 403. The mobile payment terminal 400 also comprises means (not visible in the figure) to detect gestures made by a user. In some embodiments the means to detect gestures is a solid state, low power radar component, module or chip, as with the FIG. 1 mobile payment terminal 100. In brief, the mobile payment terminal 400 is configured in the same way as the mobile payment terminal 100 but it also has an alternative, non-contactless, means for receiving user selection of an amount for payment or donation. The user may choose to use the non-contactless means for receiving user selection of an amount for payment or donation instead of using the contactless means for receiving user selection of an amount for payment or donation. The mobile payment terminal 400 is configured to allow the user to use either means for receiving user selection of an amount for payment or donation. Both means for receiving user selection of an amount for payment or donation may be used, but on separate transactions and not on the same transaction. The following description will focus on the use of the non-contactless means for receiving user selection of an amount for payment or donation.

The scrollable dial 401 comprises a cylindrical ring with an outwardly facing surface 406, a top surface 409, and a bottom surface 410. The scrollable dial 401 embraces the periphery of the circular main housing 402 such that the top surface 409 stands proud 413 of the circular main housing 402 top facing portion 407. The outer surface 406 of the scrollable dial 401 is provided with features that allow easy gripping. In particular, the scrollable dial 401 may be textured, gnarled and/or coated with or formed of a rubberised material. The scrollable dial 401 embraces snugly to the periphery of the circular main housing 402, but can nevertheless be rotated in a clockwise and/or an anti-clockwise direction relative to the circular main housing 402, which is maintained stationary.

The scrollable dial 401 is biased such that, when the scrollable dial 401 is rotated in a clockwise and/or anti-clockwise direction, upon release, the scrollable dial returns to its original position relative to the circular main housing 402. The scrollable dial 401 may comprise a resilient spring to provide variable reactive force when the scrollable dial 401 is rotated and to return the dial to its original position when released.

The scrollable dial 401 operates as a switch that detects and indicates deflection of the dial through rotation. A different output is provided depending on the direction of deflection, i.e. one output is provided if the dial is deflected clockwise from a zero position and a different output is provided if the dial is deflected anti clockwise from the zero position. Optionally, the output is dependent on the amount of deflection from the zero position. Thus, the extent of deflection by the user, as well as the direction of deflection by rotation, can be detected.

Alternatively, the scrollable dial 401 may not be biased to return to its original position upon its release after being rotated in a clockwise and/or anti-clockwise direction. In this case, the starting position of the scrollable dial is always the default zero position. A different output is provided depending on the direction of rotation, i.e. one output is provided if the dial is rotated clockwise from the zero position and a different output is provided if the dial is rotated anti clockwise from the zero position.

The sensitivity, i.e. the magnitude of the output, of the scrollable dial 101 above when rotated may also vary depending on a present payment amount. The present payment amount is the summed total of the outputs. For instance, when the scrollable dial 401 is rotated for the first time from zero, the sensitivity of the scrollable dial 401 may be set high. A deflection or rotation, depending on the type of scrollable dial 401, will result in a relatively small change in output being provided. As the present payment amount increases, the sensitivity of the scrollable dial 401 may be reduced as a function of the present payment amount so that further changes in deflection or rotation result in a greater change in the output. For instance, for changes of one unit (which may be detectable tactically through the dial) an increase in one pence or cent may be made for values between zero and ten pence or cents, with one unit changes then giving rise to changes of 5 pence or cents from ten pence or cents to fifty pence or cents. Thereafter, each unit may give rise to a change of ten pence or cents.

The scrollable dial 401 can also operate as a push button switch that can be reversibly depressed relative to the circular main housing 402, which is maintained stationary. The scrollable dial 401 can be depressed such that the top surface 409 of the scrollable dial 401 is flush against the circular main housing 402 top facing portion 407. Upon release of the scrollable dial 401, it returns to its original position such that the top surface 409 stands proud 413 of the circular main housing 402 top facing portion 407. The scrollable dial 401 may comprise a resilient spring to provide a reactive force when it is depressed such that it is biased to its original position. The entire dial or a portion of the dial may be depressed to act as a push button switch in this way. The push button switch may be virtual in that it may comprise a touch sensitive element that is not actually physically depressed and a transducer which gives the user the feeling that there was physical movement of the switch or gives the user some other haptic feedback.

The supporting base 405 comprises a cylindrical protrusion that extends from the bottom facing portion 408 of the circular main housing 402, spacing the bottom face 410 of the scrollable dial 401 and the bottom face of the main housing 408 from the surface upon which the mobile payment terminal 400 is resting. FIGS. 4 and 5 are schematic, and details of the physical arrangement are described below.

The mobile payment terminal 400 comprises a display 412, such as an LCD or OLED display, on the terminal display interface 404 for displaying information. The mobile payment terminal further comprises a payment transceiver, such as an RFID or NFC transceiver, for gathering information from a contactless payment token, via the short distance contactless radio frequency interface 403.

In alternative embodiments, the top surface 409 of the scrollable dial 401 is flush against the circular main housing 402 top facing portion 407. The scrollable dial 401 and the circular main housing 402 form a single entity that can be operated as a push button switch. When depressed, the scrollable dial 401 and the circular main housing 402 extends as a single entity towards the supporting base 405. The circular main housing 402 may comprise a resilient spring to provide a reactive force when it is depressed such that it is biased to its original position. In these embodiments, the scrollable dial 401 may also be operated as a rotatable dial in the same manner as described above.

The scrollable dial 401 and/or the scrollable dial 401 and the circular main body 407 as a single entity, also comprises user input means. These user input means allow a user to trigger actions and optionally to turn on/off mobile payment terminal 400. The user input means may comprise a bias-type push switch, a touch sensitive switch, a scrollable dial, a slider-type switch, a capacitive sensor or some other means for detecting a user touch or proximity input. In some embodiments the mobile payment terminal 400 comprises a capacitive touch sensor as an alternative to a scrollable dial. A capacitive touch sensor may be used to operate a virtual scrollable dial. In some embodiments the mobile payment terminal represents the position of a virtual scrollable dial with a visual indicator such as an indicator on a display 412 or one or more LEDs on the terminal.

The mobile payment terminal 400 is portable. It can be operated in a horizontal position as in FIG. 4 such that the top facing portion 407 of the circular main housing 402 is facing upwards. Alternatively, the mobile payment terminal 400 may be affixed to a flat surface using temporary means, for instance with strong magnets, located at the bottom facing portion 408 of the mobile payment terminal 400. The mobile payment terminal can be operated in any orientation, for instance in a vertical position such that the top facing portion 407 of the circular main housing 402 is facing sideways. Alternatively, the mobile payment terminal 400 may also be affixed to a substantially flat surface using more permanent means such as screws and/or hooks.

The mobile payment terminal 400 may also comprise means for charging a device battery or means for otherwise powering the device, for example ports for USB, micro-USB and USB-C connections, photovoltaic cells, wireless charging and background RF harvesting capabilities.

Figure 6:
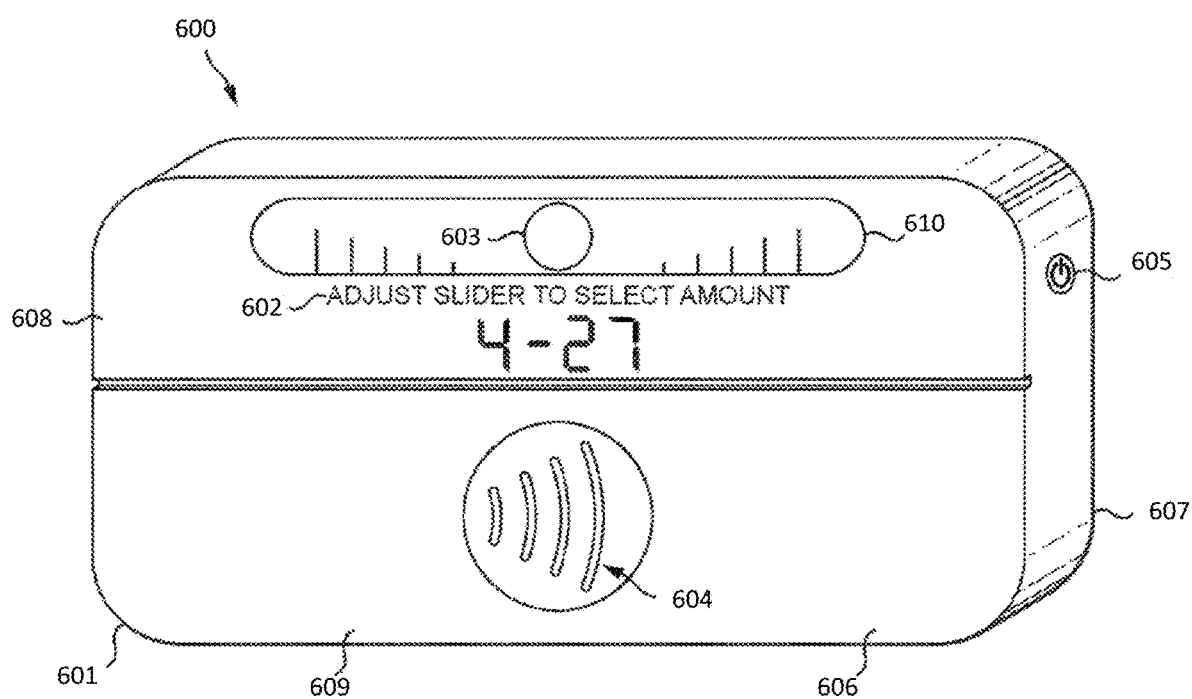
FIG. 6 is an isometric view of another mobile payment terminal according to embodiments of the present disclosure.

FIG. 6 is a perspective view of an alternate group of embodiments of the mobile payment terminal 400. Mobile payment terminal 600 comprises a rectangular main housing 601, comprising a top facing portion 606 and a bottom facing portion 607. The top facing portion 606 of the main housing 601 comprises two sections, a first section comprising a terminal display interface 608, and a second section comprising a short distance contactless radio frequency interface 609. The mobile payment terminal 600 also comprises means (not visible in the figure) to detect gestures made by a user. In some embodiments the means to detect gestures is a solid state, low power radar component, module or chip, as with the FIG. 1 mobile payment terminal 100. In brief, the mobile payment terminal 600 is configured in the same way as the mobile payment terminal 100 but it also has an alternative, non-contactless, means for receiving user selection of an amount for payment or donation. The user may choose to use the non-contactless means for receiving user selection of an amount for payment or donation instead of using the contactless means for receiving user selection of an amount for payment or donation. The mobile payment terminal 600 is configured to allow the user to use either means for receiving user selection of an amount for payment or donation. Both means for receiving user selection of an amount for payment or donation may be used, but on separate transactions and not on the same transaction. The following description will focus on the use of the non-contactless means for receiving user selection of an amount for payment or donation.

The top facing portion 606 also comprises a multi-function sliding switch 610. The multi-function sliding switch 610 comprises a sliding knob 603 that can be manipulated along a track from side to side. The sliding knob 603 also operates as a push-type switch.

The sliding switch 610 operates as a switch that detects and indicates deflection of the slider linearly. A different output is provided depending on the amount of deflection. The sliding switch may have a zero position, and may be biased to the zero position such that the slider resides at the zero position in the absence of any applied force. A different output is provided by the slider switch 610 depending on the direction of deflection, i.e. one output is provided if the slider is deflected left from the zero position and a different output is provided if the dial is deflected right from the zero position. Optionally, the output is dependent on the amount of deflection from the zero position. Thus, the extent of deflection by the user, as well as the direction of linear deflection, can be detected. Alternatively, the slider switch 610 may not be biased and may serve to provide an output that indicates deflection from any reference position.

Alternatively, the sliding switch 610 may also be a continuous, touch sensitive circular slide bar in the shape of a ring. In the centre of the ring is a push-type switch.

The mobile payment terminal 600 comprises a display 602, such as an LCD or OLED display, on the terminal display interface 608, for displaying information. The mobile payment terminal further comprises sensors, such as RFID or NFC sensors, for gathering information from an external device contactless payment token, via the short distance contactless radio frequency interface 609.

The mobile payment terminal 600 further comprises at least one user input means 605, illustrated schematically as a push-type button switch. The multi-function sliding switch 610 also comprises user input means, illustrated schematically as a slider-type switch. These user input means allow a user to turn on/off mobile payment terminal 600 and/or to trigger actions.

The mobile payment terminal 600 is portable. It can be operated in a vertical position as in FIG. 6 such that the top facing portion 606 of the rectangular main housing 601 is facing sideways. Alternatively, the mobile payment terminal 600 may be affixed to a flat surface using temporary means, for instance with strong magnets, located at the bottom facing portion 607 of the mobile payment terminal 600. The mobile payment terminal 600 can be operated in any orientation, for instance in a horizontal position such that the top facing portion 606 of the rectangular main housing 601 is facing upwards. Alternatively, the mobile payment terminal 600 may also be affixed to a substantially flat surface using more permanent means such as screws and/or hooks.

Figure 7:
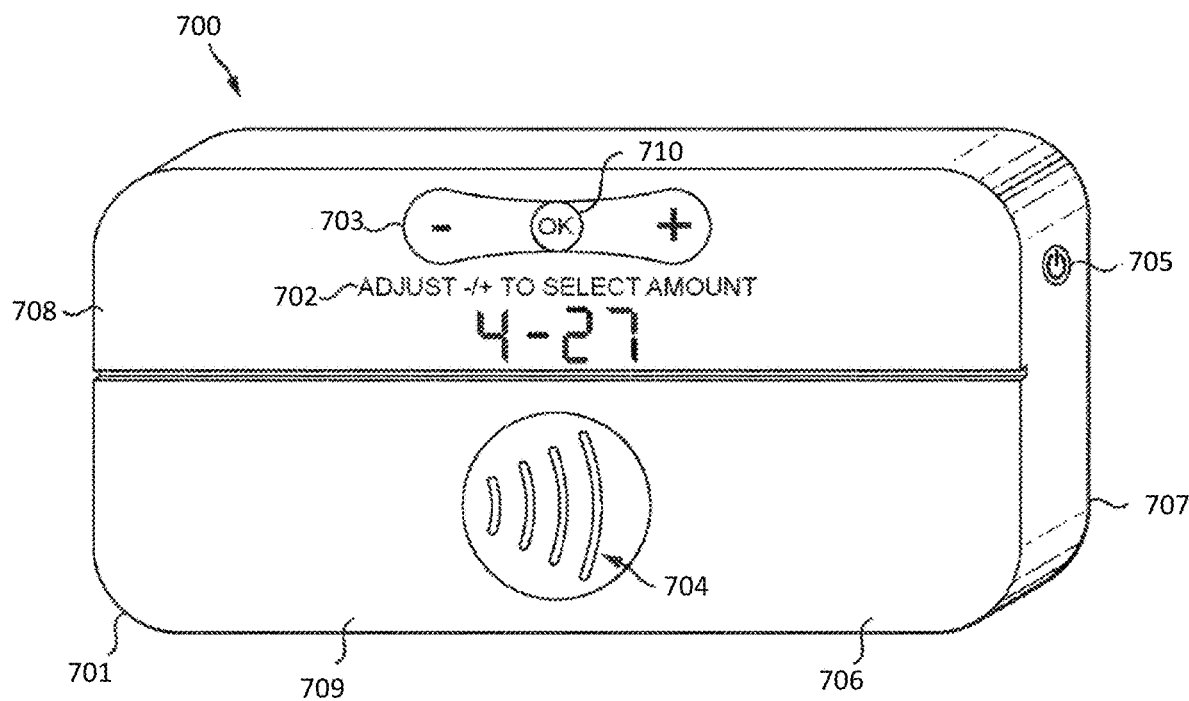
FIG. 7 is an isometric view of still a further mobile payment terminal according to embodiments of the present disclosure.

FIG. 7 is a perspective view of a third group of embodiments of a mobile payment terminal 400. Mobile payment terminal 700 comprises a rectangular main housing 701, comprising a top facing portion 706 and a bottom facing portion 707. The top facing portion 706 of the main housing 701 comprises two sections, a first section comprising a terminal display interface 708, and a second section comprising a short distance contactless radio frequency interface 709.

The mobile payment terminal 700 also comprises means (not visible in the figure) to detect gestures made by a user. In some embodiments the means to detect gestures is a solid state, low power radar component, module or chip, as with the FIG. 1 mobile payment terminal 100. In brief, the mobile payment terminal 700 is configured in the same way as the mobile payment terminal 100 but it also has an alternative, non-contactless, means for receiving user selection of an amount for payment or donation. The user may choose to use the non-contactless means for receiving user selection of an amount for payment or donation instead of using the contactless means for receiving user selection of an amount for payment or donation. The mobile payment terminal 700 is configured to allow the user to use either means for receiving user selection of an amount for payment or donation. Both means for receiving user selection of an amount for payment or donation may be used, but on separate transactions and not on the same transaction. The following description will focus on the use of the non-contactless means for receiving user selection of an amount for payment or donation.

The mobile payment terminal 400 also comprises a multi-function button adjuster 703. This is provided on the top facing portion 706 on this example. The multi-function adjuster 703 comprises a "plus" and a "minus" input means, and a confirmation "OK" input means 710 in between. These input means may be any suitable type of switch or device, for instance each may comprise a bias-type push switch, a touch sensitive switch, a scrollable dial, a slider-type switch, a capacitive sensor or some other means for detecting a user touch or proximity input.

The mobile payment terminal 700 comprises a display 702 on the terminal display interface 708 for displaying information. The mobile payment terminal further comprises sensors, such as RFID or NFC sensors, for gathering information from an external payment token via the short distance contactless radio frequency interface 709.

The mobile payment terminal 700 further comprises at least one user input means 705, illustrated schematically as a button type switch. The multi-function adjuster 703 also comprises user input means, illustrated schematically as a cluster of bias-type buttons. These user input means allow a user to turn on/off the mobile payment terminal 700 and/or to trigger actions.

The mobile payment terminal 700 is portable. It can be operated in a vertical position as in FIG. 7 such that the top facing portion 706 of the rectangular main housing 701 is facing sideways. Alternatively, the mobile payment terminal 700 may be affixed to a flat surface using temporary means, for instance with strong magnets, located at the bottom facing portion 707 of the mobile payment terminal 700. The mobile payment terminal 700 can be operated in any orientation, for instance in a horizontal position such that the top facing portion 706 of the rectangular main housing 701 is facing upwards. Alternatively, the mobile payment terminal 700 may also be affixed to a substantially flat surface using more permanent means such as screws and/or hooks.

Figure 8:
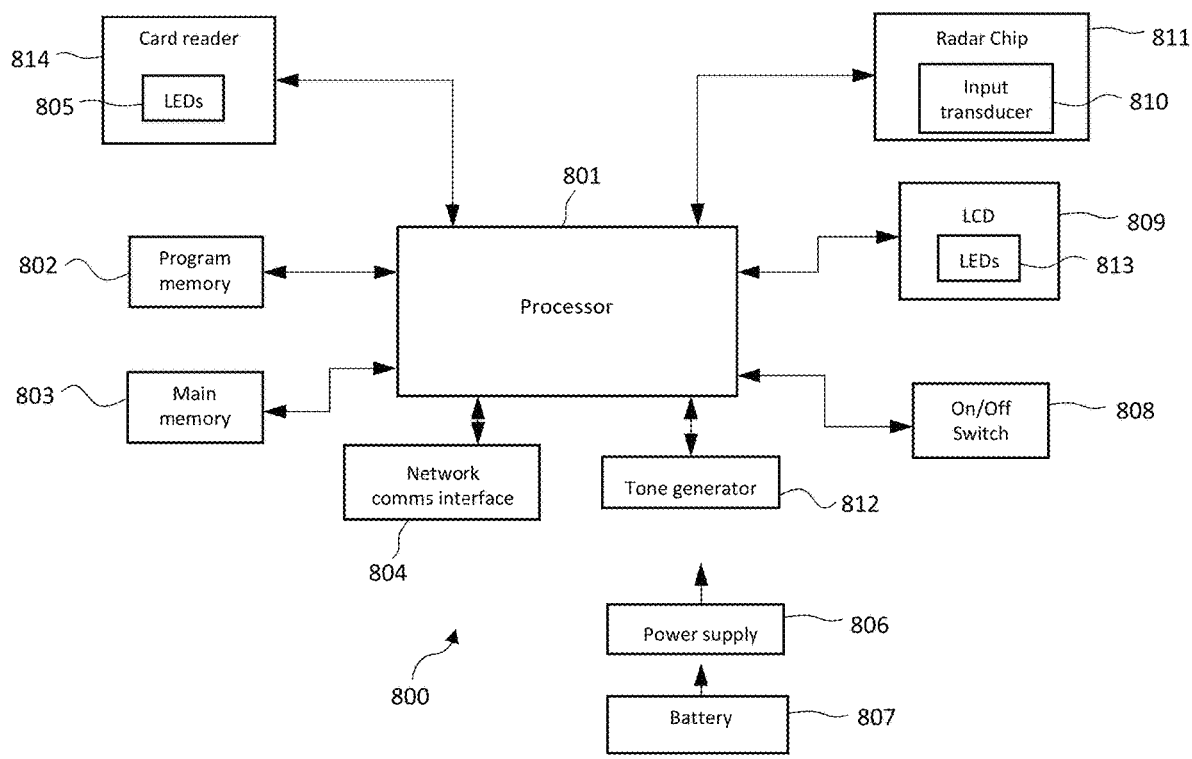
FIG. 8 is a schematic view of the FIG. 1 mobile payment terminal and showing internal components of the device.

FIG. 8 is a schematic view of components forming the mobile payment terminal 100 of FIG. 1. Within the circular main housing 101 of the mobile payment terminal 100, a plurality of components is contained. These components are controlled by a processor 801 which may for instance be a microprocessor, a Digital Signal Processor (DSP), Application Specific Integrated Circuit (ASIC), Field Programmable Gate Array (FPGA) or the like. Processor 801 executes program code (e.g. software or firmware) stored in a program memory 802. It uses a main memory 803, to execute the program code and to store intermediate results. Program memory 802 may for instance be a Read-Only Memory (ROM) or Flash memory, and main memory 803 may for instance be a Random Access Memory (RAM) or Flash memory.

In the embodiments shown in FIG. 1, the processor 801 interacts with a first input mean 808, such as a toggle switch or push button switch, via which the mobile payment terminal 100 may for instance be turned on and off. A second input mean 810 may be used to acknowledge information presented to a user of the mobile payment terminal 100. The radar sensor 811 may also comprise input means used to transmit information to the mobile payment terminal 100.

Processor 801 controls a display 809, which is embodied as a Liquid Crystal Display (LCD) but may be an organic light emitting diode (OLED) display, e-ink or any other suitable kind of display. Display 809 is used to display information to a user of the mobile payment terminal 100, for instance information on the present setting of a payment amount, and/or operating instructions, and/or any other information. Processor 801 may also control the illumination of the display 809 using one or more backlit light-sources such as coloured light emitting diodes LEDs 813 to convey information to the user. The mobile payment terminal 100 is thus capable of capturing information related to detection of gestures by the radar sensor 811. This information is then displayed on the display 809 for use by the user of the device.

Processor 801 also controls a payment token or payment card reader 814 located within the housing of the short distance contactless radio frequency interface 803. The card reader 814 is configured to communicate relevant information with a contactless payment device or token, for instance a chip-and-pin payment card, or a compatible mobile phone or tablet, or any other contactless payment devices. The relevant information received from the contactless payment device is stored in the main memory 803 of the mobile payment terminal 100 to be processed at a later time.

Processor 801 also controls one or more light-sources such as light emitting diodes LEDs 805 to illuminate a contactless payment indicator logo located on the housing of the short distance contactless radio frequency interface 103. The processor 801 may control the one or more LEDs 805 to flash intermittently. The contactless payment indicator logo may comprise a diffuser in front of the light-sources, for instance a diffuser made from a piece of acrylic glass or polycarbonate.

Processor 801 also controls a tone generator 812 to emit a tone within the housing of the short distance contactless radio frequency interface 803. The processor 801 may control the mobile payment terminal 100 tone generator 812 to emit one or more tones at any time during the operation of the mobile payment terminal 100. This is used to provide audio cues to the user of a transaction between the mobile payment terminal 100 and the user.

Processor 801 also controls a network communications interface 804 to connect with another device, for instance an acquirer owned terminal not shown in FIG. 8. When the processor 801 communicates with another device such as the acquirer owned terminal, digital information such as payment transaction information is transferred from the mobile payment terminal 100 to the acquirer owned terminal for further processing. The mobile payment terminal 100 processor 801 can also receive digital information from the acquirer owned device via the interface 804. The interface 804 may operate according to a mobile telephony communications protocol.

The battery 807 may be charged by an external power source connected, for example, via USB, micro-USB or USB-C connection. The battery may also be charged using photovoltaic cells, wireless charging or background RF harvesting.

Figure 9:
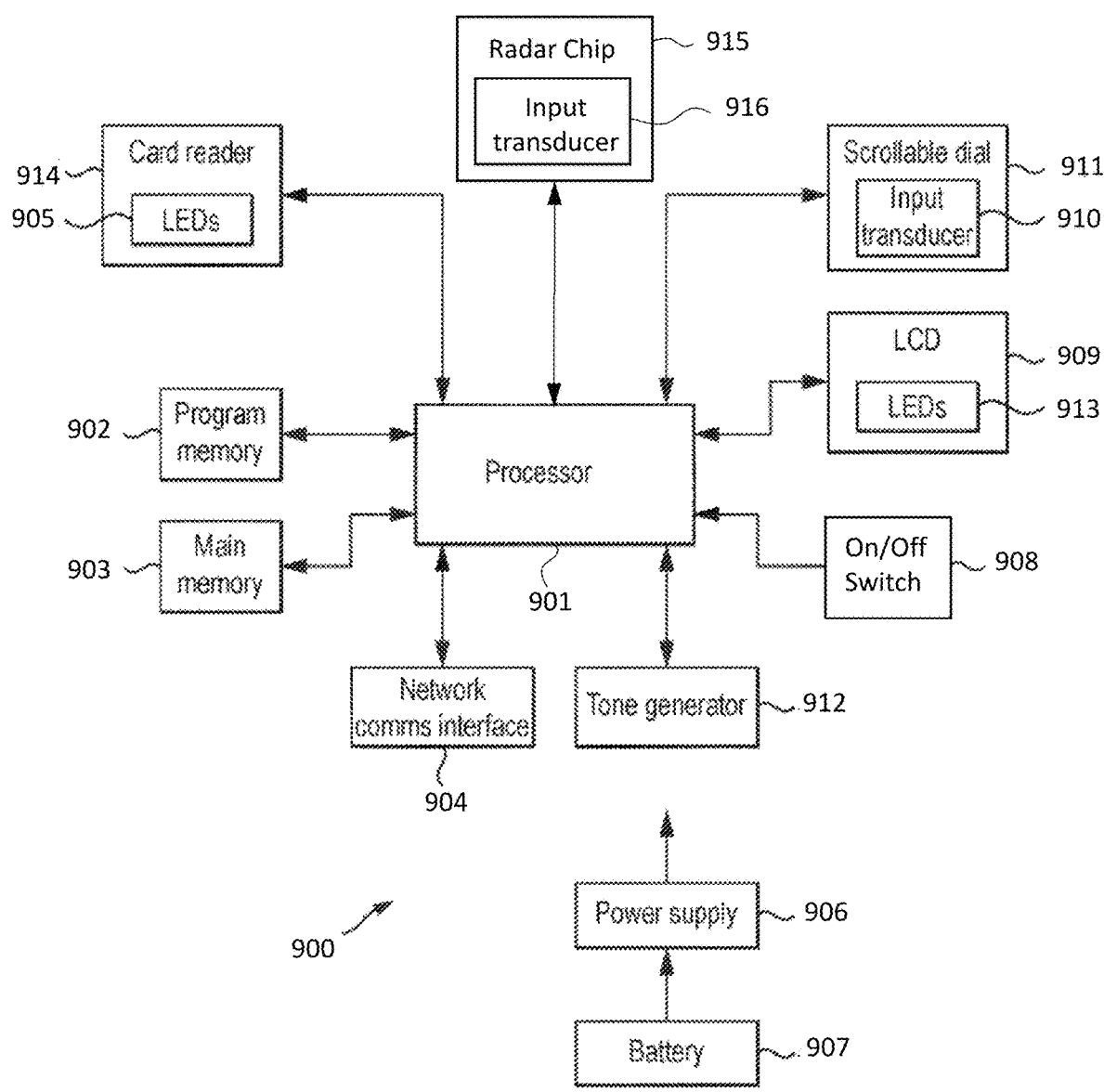
FIG. 9 is a schematic view of the FIG. 4 mobile payment terminal and showing internal components of the device.

FIG. 9 is a schematic view of components forming the mobile payment terminal 400 of FIGS. 4 and 5 or the terminal 600, or the terminal 700. Within the circular main housing 402 of the mobile payment terminal 400, a plurality of components is contained. These components are controlled by a processor 901 which may for instance be a microprocessor, a Digital Signal Processor (DSP), Application Specific Integrated Circuit (ASIC), Field Programmable Gate Array (FPGA) or the like. Processor 901 executes program code (e.g. software or firmware) stored in a program memory 902. It uses a main memory 903, to execute the program code and to store intermediate results. Program memory 902 may for instance be a Read-Only Memory (ROM) or Flash memory, and main memory 903 may for instance be a Random Access Memory (RAM) or Flash memory.

In embodiments such as those shown in FIGS. 4 to 7, the processor 901 interacts with a first input mean 908, via which the mobile payment terminal 900 may for instance be turned on and off. A second input mean 910 may be used to acknowledge information presented to a user of the mobile payment terminal 400. The scrollable dial 911 may also comprise input means used to transmit information to the mobile payment terminal 400. The radar sensor 811 constitutes further input means used to transmit information to the mobile payment terminal 100. The mobile payment terminal 100 is thus capable of capturing information related to detection of gestures by the radar sensor 811.

Processor 901 controls a display 909, which is embodied as a Liquid Crystal Display (LCD) or an OLED display for instance. Display 909 is used to display information to a user of the mobile payment terminal 400, for instance information on the present setting of a payment amount, and/or operating instructions, and/or any other information. Processor 901 may also control the illumination of the display 909 using one or more backlit light-sources such as coloured light emitting diodes LEDs 913 to convey information to the user. The mobile payment terminal 400 is thus capable of capturing information related to manipulation of the scrollable dial 911. This information is then displayed on the display 909 for use by the user of the device. Information captured by the radar sensor 811 can also be displayed on the display 809 for use by the user of the device.

Processor 901 also controls a payment token or payment card reader 914 located within the housing of the short distance contactless radio frequency interface 403. The card reader 914 is configured to communicate relevant information with a contactless payment device or token, for instance a chip-and-pin payment card, or a compatible mobile phone or tablet, or any other contactless payment devices. The relevant information received from the contactless payment device is stored in the main memory 903 of the mobile payment terminal 400 to be processed at a later time.

Processor 901 also controls one or more light-sources such as light emitting diodes LEDs 905 to illuminate a contactless payment indicator logo 411 located on the housing of the short distance contactless radio frequency interface 403. The processor 901 may control the one or more LEDs 905 to flash intermittently. The contactless payment indicator logo 411 may comprise a diffuser in front of the light-sources, for instance a diffuser made from a piece of acrylic glass or polycarbonate.

Processor 901 also controls a tone generator 912 to emit a tone within the housing of the short distance contactless radio frequency interface 403. The processor 901 may control the mobile payment terminal 400 tone generator 912 to emit one or more tones at any time during the operation of the mobile payment terminal 400. This is used to provide audio cues to the user of a transaction between the mobile payment terminal 400 and the user.

Processor 901 also controls a network communications interface 904 to connect with another device, for instance an acquirer owned terminal not shown in FIG. 9. When the processor 901 communicates with another device such as the acquirer owned terminal, digital information such as payment transaction information is transferred from the mobile payment terminal 400 to the acquirer owned terminal for further processing. The mobile payment terminal 400 processor 901 can also receive digital information from the acquirer owned device via the interface 904. The interface 904 may operate according to a mobile telephony communications protocol.

Figure 10:
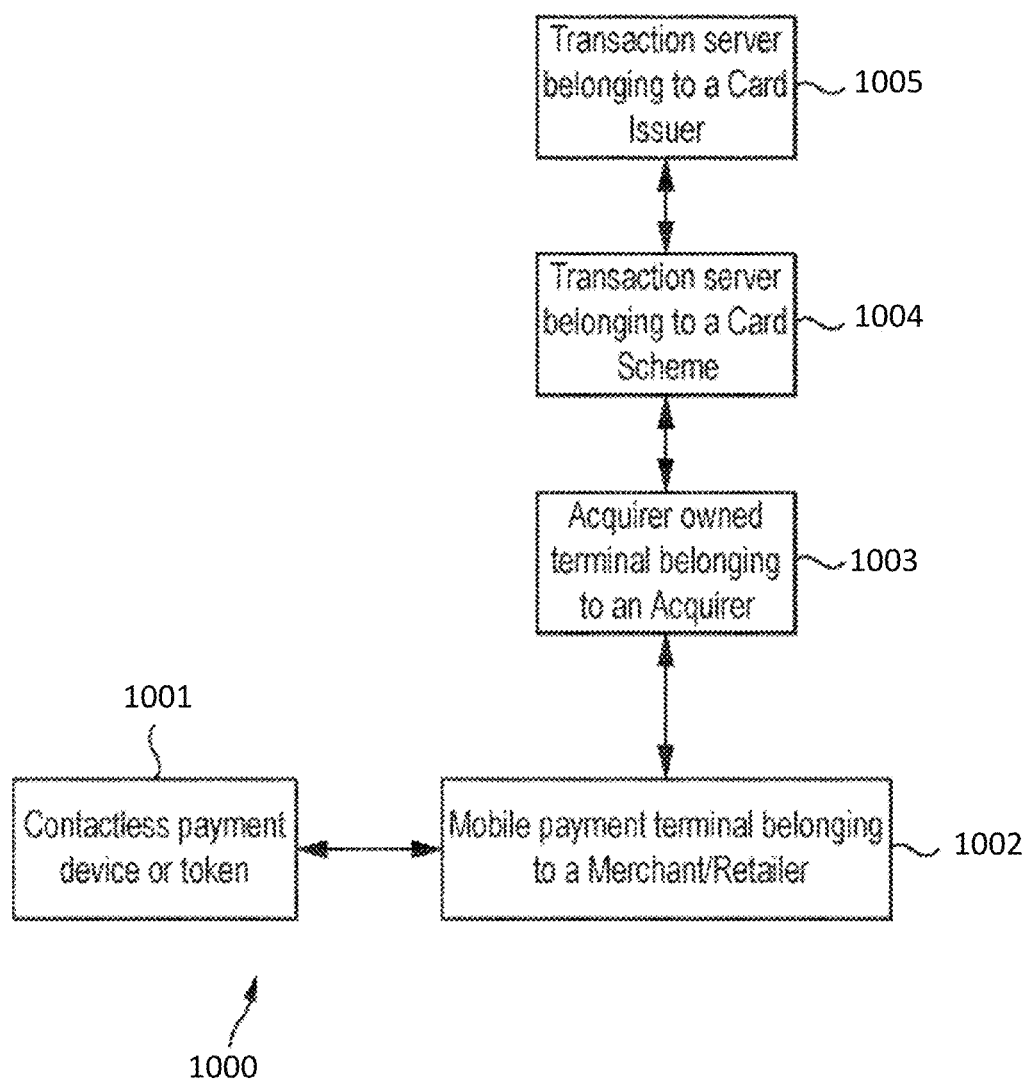
FIG. 10 shows a number of stakeholders participating in a contactless payment transaction and how the payment transaction is processed.

FIG. 10 is a high-level system overview, showing a number of stakeholders participating in a contactless payment transaction and how a contactless payment transaction is processed. In FIG. 10, there are a total of five stakeholders in the contactless payment transaction process namely, the owner of a contactless payment device or token 1001, a merchant/retailer who owns and operates a mobile payment terminal 1002, an acquirer who owns and operates an acquirer owned terminal 1003, a card scheme who owns and operates a transaction server 1004 and a card issuer who also owns and operates a transaction server 1005.

The contactless payment device or token 1001 is a contactless payment device, for instance a contactless debit card, or a mobile device or tablet configured as a contactless payment device.

The merchant/retailer in 1002 is a goods and/or services provider to the owner of the contactless payment device holder or token 1001, in this case a restaurant. The merchant/retailer 1002 interacts directly with the contactless payment device 1001 during a contactless payment transaction via the mobile payment terminal 100. The merchant/retailer 1002 may also be a service provider or a charitable organisation.

The acquirer in 1003 processes contactless payment transactions for the merchant/retailer in 1002 under a pre-negotiated agreement between the merchant/retailer in 1002 and the acquirer in 1003. Depending on the agreement terms, the acquirer in 1003 may provide an acquirer owned terminal used to perform part of the contactless payment transaction.

The card scheme in 1004 (or payment processing network) is operated by an organisation that manages and controls the operation and clearing of a contactless payment device payment transaction according to pre-agreed rules via transaction servers. Some examples of card scheme organisations that operate worldwide are American Express, Diners Club, JCB, Maestro, MasterCard and Visa (including Electron and Debit).

The card issuer in 1005 is a bank, building society or financial organisation that provides accounts to users and issues contactless payment devices such as debit or credit cards, e.g. the payment card device holders in 1001. The card issuer in 1005 is responsible for contactless payment transactions made on the contactless payment devices that they have issued, and is responsible for debiting funds from the relevant account via transaction servers.

The card scheme in 1004 is responsible for passing the contactless payment transaction details from the acquirer 1003 to the card issuer 1005 and for passing payments back to the acquirer 1003, which in turn pays the merchant/retailer 1002 ideally in the usual manner of payment transactions.

The acquirer in 1003 is responsible for receiving payment transaction details from the mobile payment terminal 100 via the acquirer owned terminal, passing this information through to the card issuer in 1005 via the card scheme in 1004 for authorisation and completing the processing of the payment transaction ideally in the usual manner of payment transactions.

The transaction and payment scheme illustrated in FIG. 10 is merely an example of one possible transaction. Other contactless transactions and payment networks may be used, for example, transactions using decentralised payment networks facilitated by distributed ledger and blockchain technologies.

FIG. 11 is a table showing the various operating states that the mobile payment terminal 100 can enter into. The mobile payment terminal 100 can be in four states. In State 1 1102, the mobile payment terminal 100 is off. When turned on, the mobile payment terminal 100 can be in one of three states, i.e. States 2-4, depending on what task the mobile payment terminal 100 is performing in the contactless payment transaction process. Depending on what state the mobile payment terminal 100 is in, the terminal user interface 1106 and the short distance contactless radio frequency interface 1107 can be either on or off respectively as per table 1100 in FIG. 11. The states will be discussed in further detail in the following sections.

Figure 12:
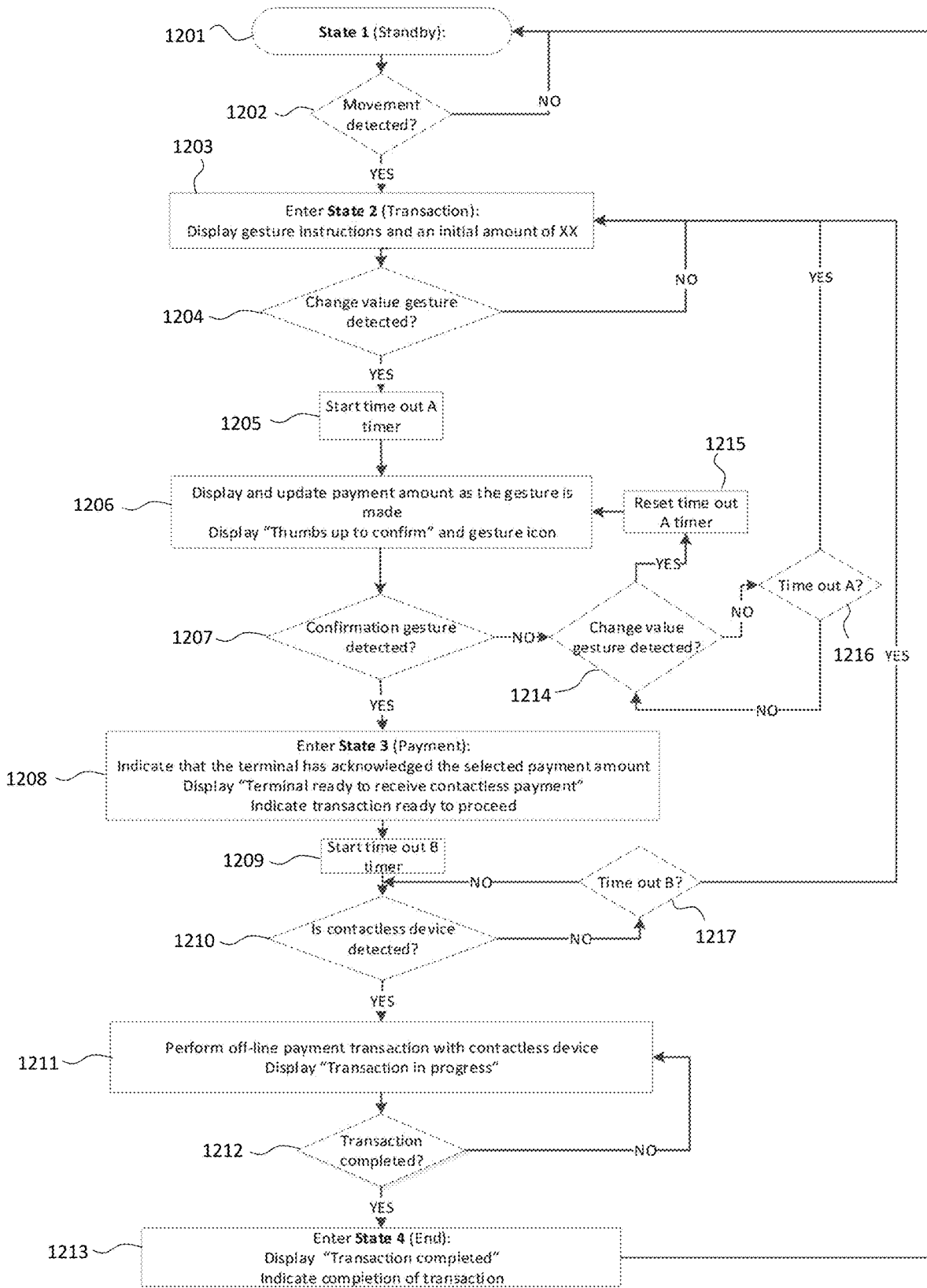
FIG. 12 is a flow chart showing the operation of the FIG. 1 mobile payment terminal according to embodiments of the disclosure.
Figure 14:
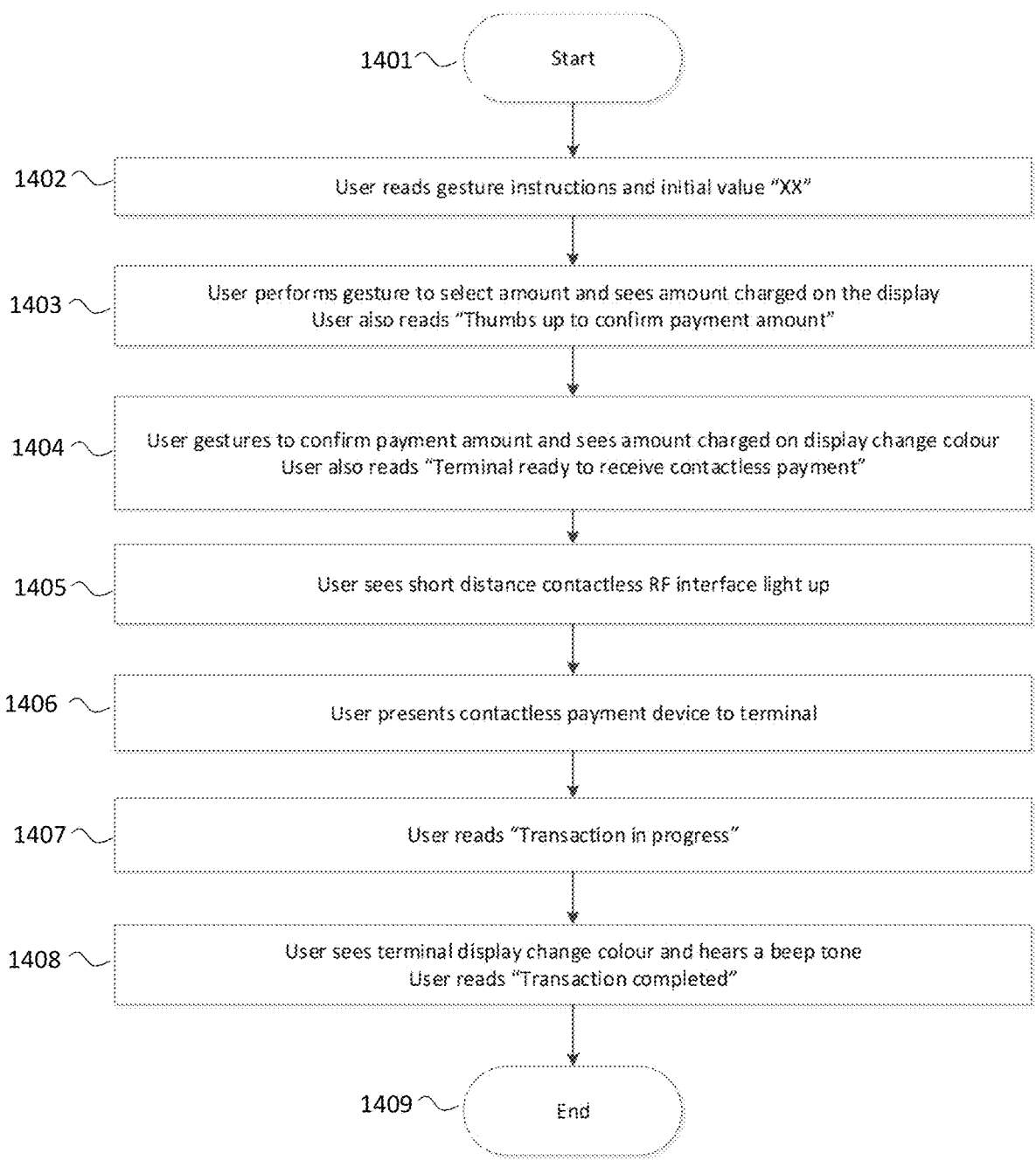
FIG. 14 is a flow chart showing the user experience of the FIG. 1 mobile payment terminal according to embodiments of the disclosure.

FIG. 12 and FIG. 14 are flow charts illustrating the operation of the mobile payment device 100 and the user's experience respectively when a contactless payment transaction is made. The flow chart in FIG. 12 illustrates how the mobile payment terminal 100 interacts with the user and how it operates internally during a contactless payment transaction. The flow chart in FIG. 14 illustrates what the user experiences when he or she utilises the mobile payment terminal to make a contactless payment. In FIG. 12, the operation 1200 starts for instance when the mobile payment terminal 100 is in a low power standby mode in State 1 1201. In State 1 the processor 801 may cause the display 809 to show an image as seen in display 301. In a step 1202, the mobile payment terminal 100 processor 801 scans for movement in proximity to the device using radar sensor 811. If no movement is detected, the mobile payment terminal 100 remains in low power standby mode, State 1. If movement is detected, the mobile payment terminal 100 enters State 2, "Transaction" mode, in a step 1203. In this step, the processor 801 controls the terminal display interface 104 to turn on and the display 809 to display information. The information displayed may contain operating instructions, for instance the instructions "Turn hand to select payment amount" alongside a graphic showing the user what gesture to perform, and a default minimum spend amount "XX". In this step, the processor 801 also controls the backlit LEDs 813 in the display 809 to illuminate the display in a colour, for instance the colour red. The data on display is advantageously illuminated in the chosen colour to indicate to the user that the mobile payment terminal is in a particular state, for instance in "Transaction" state, ready to receive user input. This reduces the possibility that the user may think that he or she has erroneously made a contactless payment during operation. In a step 1204, the processor 801 determines whether or not a user has performed a gesture corresponding to a change transaction value output using radar sensor 811. If a gesture corresponding to a change value output is not detected, the mobile payment terminal 100 remains in State 2. If a gesture corresponding to a change value output is detected, the processor 801 triggers a time out A timer to start counting in a step 1205. The time out period for time out A timer may for instance be set at 10 seconds. This feature provides a user with an option to "cancel" or terminate the transaction if the user changes his or her mind. Once time out A timer is started, in a step 1206, the processor 801 controls the display 809 to display the present data representation of a payment amount selected by the user using the gestures corresponding to a change value output, incrementing from the minimum "XX" spend value. The payment value is constantly updated by the processor 801 on the display 809 as the radar sensor 811 detects gestures made by the user, allowing the user to know what the payment amount is currently set at. In this step, the processor 801 also controls the display 809 to display further operating instructions, for instance the instructions "Thumbs up to confirm" and a graphic showing the user the appropriate gesture.

In a step 1207, the processor 809 determines whether or not the gesture corresponding to a confirmation output has been detected. If the gesture corresponding to a confirmation output is not detected, the processor 809 determines if user has performed a gesture corresponding to a change transaction value output in a step 1214. On a positive determination in step 1214, the processor resets the time out A timer in a step 1215 and returns to step 1206. This loop will repeat as long as the user is performing a gesture corresponding to a change transaction value output to set a desired payment amount. Resetting the time out A timer in step 1215 ensures that while the user is setting the desired payment amount, the contactless payment transaction does not time out prematurely. On a negative determination in step 1214, the processor proceeds to determine if the time out A timer has timed out in a step 1216. On a positive determination in step 1216, the processor 801 controls the mobile payment terminal 100 to return to State 2 in step 1203. The time out A timer is introduced in step 1205 advantageously as a safety feature to ensure that if the user changes his or her mind on making a contactless payment mid-way through scrolling the scrollable dial 101 and walks away, the last amount set by the user is reset and the mobile payment terminal 100 returns to state 2. This reduces the possibility of another user being erroneously charged if he or she is in close proximity to the mobile payment terminal 100. On a negative determination in step 1216, the processor returns to step 1214 to determine if a gesture has been detected.

In step 1207, if the processor 801 determines that the gesture corresponding to a confirmation output has been made, it controls the mobile payment terminal 100 to enter State 3, "Payment" mode, in a step 1208. In this step, the processor 801 controls the short distance contactless radio frequency interface 103 to turn on while keeping the terminal display interface 104 turned on. In this step the processor 801 also controls the backlit LEDs 813 in the display 809 to illuminate the display in another colour, for instance the colour green. The data on display is advantageously illuminated in the chosen colour to indicate to the user for instance that the mobile payment terminal has acknowledged the desired payment amount set by the user. This reduces the possibility that the user may think that he or she has erroneously made a contactless payment during operation. The processor 801 also controls the display 809 to status information, for instance the information "Terminal ready to receive contactless payment". The processor 801 further controls the display 809 to show a contactless payment indicator logo located in operational proximity of the short distance contactless radio frequency interface 103. This advantageously directs the user to present his or her contactless payment device in close proximity to the short distance contactless radio frequency interface 103 to facilitate a contactless payment transaction.

In a step 1209, the processor proceeds to trigger time out B timer to start counting. The time out period for time out B timer may for instance be set at 5 seconds. Again, this feature provides the user with an option to "cancel" or terminate the transaction if the user changes his or her mind. At this step, a countdown timer may be displayed on the display to indicate to the user how much time he or she has remaining to complete the payment transaction before the transaction is "cancelled". In a step 1210, the processor 801 detects whether a contactless payment device is within a threshold proximity to the short distance contactless radio frequency interface 103. The threshold proximity between the contactless payment device and the short distance contactless radio frequency interface 103 may for instance be below 20 mm. If the processor 801 detects a contactless payment device to be within the proximity threshold, the contactless payment transaction proceeds to a step 1211.

In a step 1211, the processor 801 controls the card reader 814 within the short distance contactless radio frequency interface 103 to extract perform authentication with and communicate relevant data with the contactless payment device ideally in the usual manner of contactless payment transactions. In this step, the processor 801 also collects all the relevant information of the present contactless payment transaction, for instance, the time of transaction, the payment amount, security data received from the contactless payment device etc. and stores this information in the main memory 803 to be processed at a later time. In this step, the processor 801 also controls the display 809 to display status information, for instance the information "Transaction in Progress".

In these embodiments, the mobile payment terminal may optionally be a polled terminal. A polled terminal processes and stores accepted contactless payment transactions throughout the day, and then transmit their details to an acquirer using a telephone connection established between the mobile payment terminal 100 and an acquirer owned terminal at night. This kind of system can also be referred to as a predominantly off-line terminal or a POT.

In a step 1212, the processor 801 determines if the payment transaction is complete. On a negative determination, the contactless payment transaction process returns to step 1211. On a positive determination, the processor 801 controls the mobile payment terminal 100 to enter State 4, "End" state. In this step, the processor 801 controls the short distance contactless radio frequency interface 103 to turn off while keeping the terminal display interface 104 turned on. The processor 801 also controls the display 809 to display status information, for instance the information "Transaction Completed". This is to alert the user that the payment transaction is complete. The processor 801 also controls the tone generator 812 to play a "beep" tone as an audio cue to indicate that the payment transaction is complete. Finally, the processor 801 controls the mobile payment terminal 100 to return to step 1201 and enter State 1. In State 1, the mobile payment terminal 100 returns to "Standby" mode and remains in this state ready to process the next payment transaction.

The flow chart in FIG. 14 illustrates what the user experiences when he or she utilises the mobile payment terminal 100 to make a contactless payment. When a decision to make a contactless payment is made in a step 1401, the user begins by reading the operating instructions presented on the terminal display interface 104 display 809, for instance the instructions "Turn hand to select payment amount" and a graphic showing the appropriate gesture in a step 1402. In this step, the user is also presented with a minimum payment amount XX on the display 809. The display 809 is also illuminated in a colour, for instance the colour red in this step.

In a step 1403, the user begins to perform a gesture corresponding to a change transaction value output, for instance moving the hand in a clockwise direction to increase a desired payment amount from "XX". As the gesture being performed by the user is detected, the present payment amount set by the user is displayed on the terminal display interface 104 display 809. This value is updated on the display 809 at a refresh rate of 200 ms. This ensures that while the gesture is being performed, the user is presented with the most current intended payment amount. In this step, the user is also presented with further operating instructions, for instance the instructions "Thumbs up to confirm" and a graphic showing an appropriate gesture. This ensures that the user is informed of what he or she is required to do next after he or she completes setting the desired payment amount.

Once the desired payment amount is set by the user, in a step 1404, the user performs a gesture corresponding to a confirmation output to confirm the amount on the mobile payment terminal 100. Upon detecting the payment amount confirmation via the radar sensor 811, the illumination on the display 809 changes colour, for instance to the colour green. This advantageously indicates to the user that the mobile payment terminal 100 acknowledges the payment amount confirmation. In this step, the user is also presented with status information, for instance the information "Terminal ready to receive contactless payment".

In a next step 1405, the user sees a contactless payment indicator logo or similar instructions displayed on the display 809 located in operational proximity of the short distance contactless radio frequency interface 103 to indicate to the user that the mobile payment terminal is ready to proceed with the contactless payment transaction. In this step, in conjunction with the display of the contactless payment indicator logo or similar instructions, the user may also see on the display 809 may display of a timer, for instance counting down from Y seconds. Advantageously, this can be used to give an indication to the user how much time he or she presently has left to present a contactless payment device to the short distance contactless radio frequency interface 103. In a step 1406, the user presents the contactless payment device, for instance, a contactless payment card to the short distance contactless radio frequency interface 103.

Upon detection of the contactless payment device by the mobile payment terminal 100, the user is presented with further status information, for instance the information "Transaction in progress" in a step 1407. In this step, upon completion of the payment transaction, the user is presented with yet further status information, for instance the information "Transaction completed". In this step, the user sees the logo or instructions on the display 809 also change colour, for instance to the colour red to indicate to the user that the payment transaction is complete. Finally, in step 1408, the user witnesses the mobile payment terminal also emit for instance a "beep" tone as an audio cue via the tone generator 812 as an alternative indicator to the user that the contactless payment transaction is complete.

FIG. 12 and FIG. 14 above relates to the operation of the mobile payment terminal 100 as in FIG. 1 and the user's experience when operating the mobile payment terminal 100 as in FIG. 1 respectively.

Figure 13:
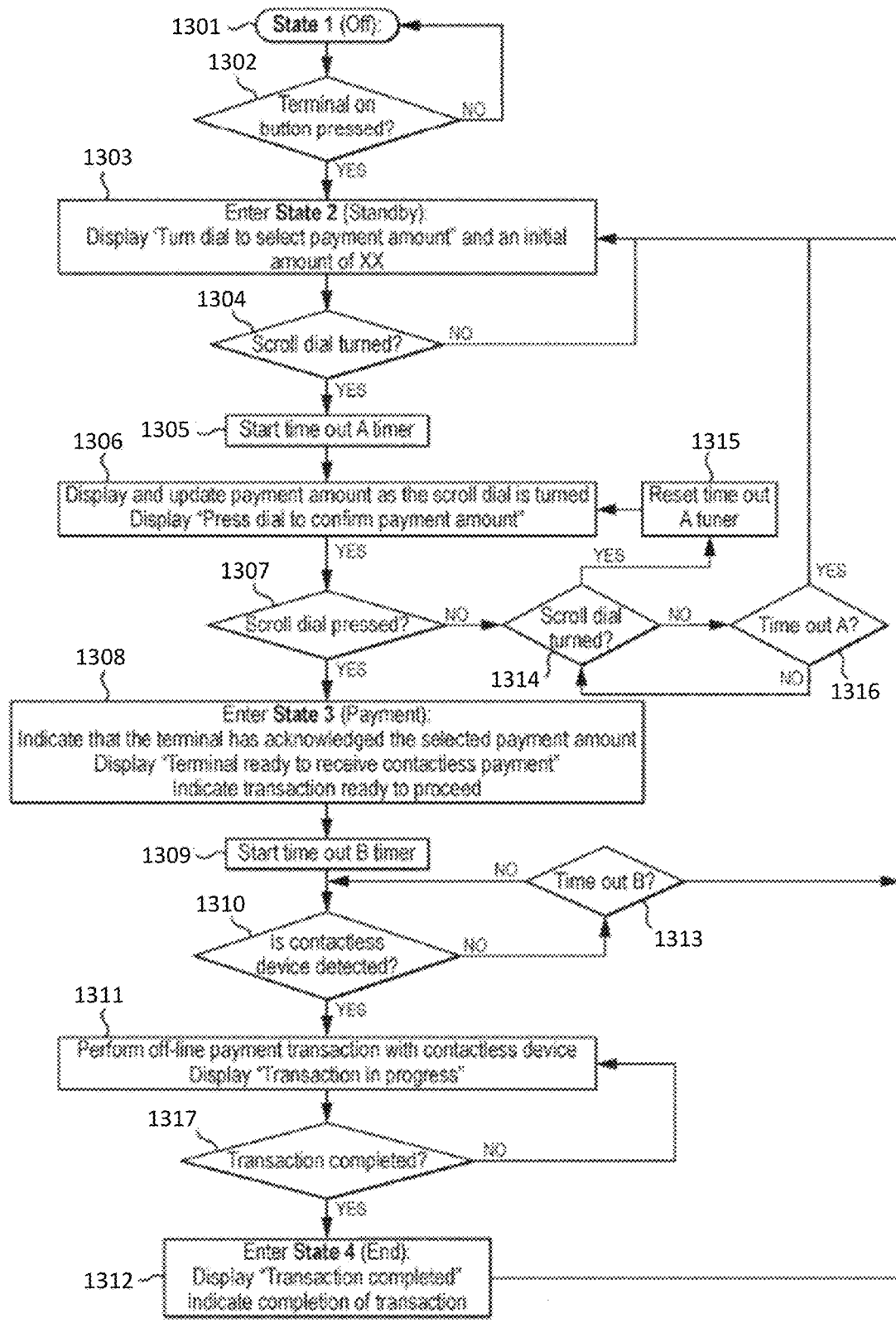
FIG. 13 is a flow chart showing the operation of the FIG. 4 mobile payment terminal according to embodiments of the disclosure.
Figure 15:
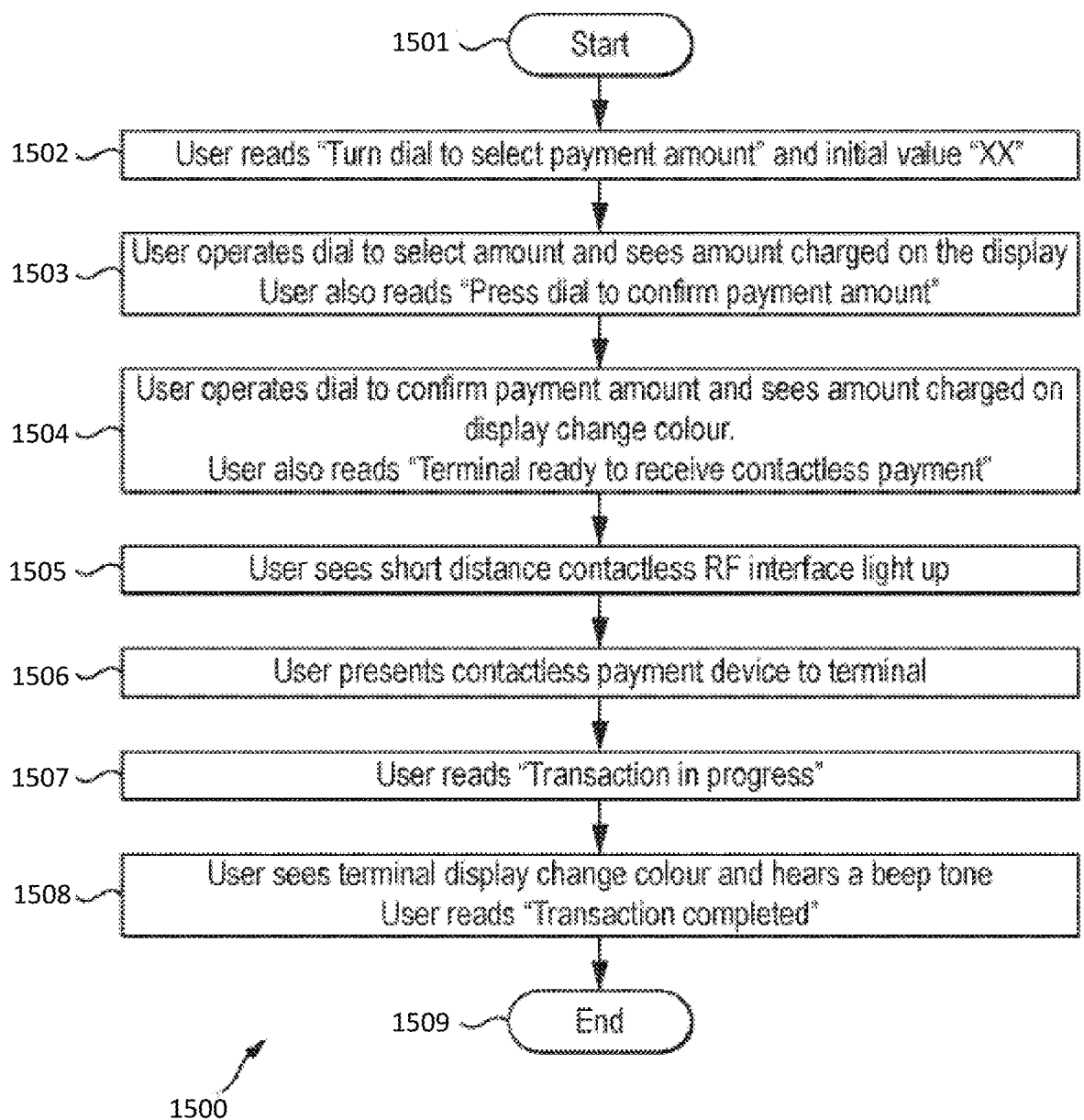
FIG. 15 is a flow chart showing the user experience of the FIG. 4 mobile payment terminal according to embodiments of the disclosure.

FIG. 13 and FIG. 15 are flow charts illustrating the operation of the mobile payment device 400 and the user's experience respectively when a contactless payment transaction is made. The flow chart in FIG. 13 illustrates how the mobile payment terminal 400 interacts with the user and how it operates internally during a contactless payment transaction. The flow chart in FIG. 15 illustrates what the user experiences when he or she utilises the mobile payment terminal to make a contactless payment.

In FIG. 13, the operation 1300 starts for instance when the mobile payment terminal 400 is off in State 1 1301. In a step 1302, the mobile payment terminal 400 processor 901 determines if the terminal "power on" button 506 is pressed. If terminal "power on" button 506 press is not detected, the mobile payment terminal 400 remains off in State 1. If terminal "power on" button 506 press is detected, the mobile payment terminal 400 enters State 2, "Standby" mode, in a step 1303. In this step, the processor 901 controls the terminal display interface 404 to turn on and the display 909 to display information. The information displayed may contain operating instructions, for instance the instructions "Turn dial to select payment amount", and a default minimum spend amount "XX". In this step, the processor 901 also controls the backlit LEDs 913 in the display 909 to illuminate the display in a colour, for instance the colour red. The data on display is advantageously illuminated in the chosen colour to indicate to the user that the mobile payment terminal is in a particular state, for instance in "Standby" state, ready to receive user input. This reduces the possibility that the user may think that he or she has erroneously made a contactless payment during operation.

In a step 1304, the processor 901 determines whether or not the scrollable dial 401 is operated by a user. If rotation of the scrollable dial 401 is not detected, the mobile payment terminal 400 remains in State 2. If rotation of the scrollable dial 401 is detected, the processor 901 triggers a time out A timer to start counting in a step 1305. The time out period for time out A timer may for instance be set at 10 seconds. This feature provides a user with an option to "cancel" or terminate the transaction if the user changes his or her mind. Once time out A timer is started, in a step 1306, the processor 901 controls the display 909 to display the present data representation of a payment amount selected by the user using the scrollable dial 401, incrementing from the minimum "XX" spend value. The payment value is constantly updated by the processor 901 on the display 909 as the scrollable dial 401 is turned by the user, allowing the user to know what the payment amount is currently set at. In this step, the processor 901 also controls the display 909 to display further operating instructions, for instance the instructions "Press dial to confirm payment amount".

In a step 1307, the processor 909 determines whether or not the scrollable dial is depressed. If the scrollable dial 401 is not depressed, the processor determines if the scrollable dial 401 is being rotated in a step 1314. On a positive determination in step 1314, the processor resets the time out A timer in a step 1315 and returns to step 1306. This loop will repeat as long as the user is scrolling the scrollable dial 401 to set a desired payment amount. Resetting the time out A timer in step 1315 ensures that while the user is setting the desired payment amount, the contactless payment transaction does not time out prematurely. On a negative determination in step 1314, the processor proceeds to determine if the time out A timer has timed out in a step 1316. On a positive determination in step 1316, the processor 901 controls the mobile payment terminal 400 to return to State 2 in step 1303. The time out A timer is introduced in step 1305 advantageously as a safety feature to ensure that if the user changes his or her mind on making a contactless payment mid-way through scrolling the scrollable dial 401 and walks away, the last amount set by the user is reset and the mobile payment terminal 400 returns to "Standby" state. This reduces the possibility of another user being erroneously charged if he or she is in close proximity to the mobile payment terminal 400. On a negative determination in step 1316, the processor returns to step 1314 to determine if the scrollable dial has been turned.

In step 1307, if the processor 901 determines that the scrollable dial 401 is depressed, it controls the mobile payment terminal 400 to enter State 3, "Payment" mode, in a step 1308. In this step, the processor 901 controls the short distance contactless radio frequency interface 403 to turn on while keeping the terminal display interface 404 turned on. In this step the processor 901 also controls the backlit LEDs 913 in the display 909 to illuminate the display in another colour, for instance the colour green. The data on display is advantageously illuminated in the chosen colour to indicate to the user for instance that the mobile payment terminal has acknowledged the desired payment amount set by the user. This reduces the possibility that the user may think that he or she has erroneously made a contactless payment during operation. The processor 901 also controls the display 909 to status information, for instance the information "Terminal ready to receive contactless payment". The processor 901 further controls the LEDs 905 to illuminate the contactless payment indicator logo 411 located on the housing of the short distance contactless radio frequency interface 403. This advantageously directs the user to present his or her contactless payment device in close proximity to the short distance contactless radio frequency interface 403 to facilitate a contactless payment transaction.

In a step 1309, the processor proceeds to trigger time out B timer to start counting. The time out period for time out B timer may be set at 5 seconds. Again, this feature provides the user with an option to "cancel" or terminate the transaction if the user changes his or her mind. At this step, a countdown timer may be displayed on the display to indicate to the user how much time he or she has remaining to complete the payment transaction before the transaction is "cancelled". In a step 1310, the processor 901 detects whether a contactless payment device is within a threshold proximity to the short distance contactless radio frequency interface 403. The threshold proximity between the contactless payment device and the short distance contactless radio frequency interface 403 may for instance be below 20 mm. If the processor 901 detects a contactless payment device to be within the proximity threshold, the contactless payment transaction proceeds to a step 1311.

In a step 1311, the processor 901 controls the card reader 814 within the short distance contactless radio frequency interface 403 to extract perform authentication with and communicate relevant data with the contactless payment device ideally in the usual manner of contactless payment transactions. In this step, the processor 901 also collects all the relevant information of the present contactless payment transaction, for instance, the time of transaction, the payment amount, security data received from the contactless payment device etc. and stores this information in the main memory 903 to be processed at a later time. In this step, the processor 901 also controls the display 909 to display status information, for instance the information "Transaction in Progress".

In these embodiments, the mobile payment terminal is advantageously a polled terminal. A polled terminal processes and stores accepted contactless payment transactions throughout the day, and then transmit their details to an acquirer using a telephone connection established between the mobile payment terminal 400 and an acquirer owned terminal at night. This kind of system can also be referred to as a predominantly off-line terminal or a POT.

In a step 1317, the processor 901 determines if the off-line payment transaction is complete. On a negative determination, the contactless payment transaction process returns to step 1311. On a positive determination, the processor 901 controls the mobile payment terminal 400 to enter State 4, "End" state. In this step, the processor 901 controls the short distance contactless radio frequency interface 403 to turn off while keeping the terminal display interface 404 turned on. The processor 901 also controls the display 909 to display status information, for instance the information "Transaction Completed". This is to alert the user that the payment transaction is complete. The processor 901 also controls the tone generator 912 to play a "beep" tone as an audio cue to indicate that the payment transaction is complete. Finally, the processor 901 controls the mobile payment terminal 400 to return to step 1301 and enter State 2. In State 2, the mobile payment terminal 400 returns to "Standby" mode and remains in this state ready to process the next payment transaction.

The flow chart in FIG. 15 illustrates what the user experiences when he or she utilises the mobile payment terminal to make a contactless payment. When a decision to make a contactless payment is made in a step 1501, the user begins by reading the operating instructions presented on the terminal display interface 404 display 909, for instance the instructions "Turn dial to select payment amount" in a step 1502. In this step, the user is also presented with a minimum payment amount XX on the display 909. The display 909 is also illuminated in a colour, for instance the colour red in this step.

In a step 1503, the user begins to rotate the scrollable dial 401, for instance in a clockwise direction to increase a desired payment amount from "XX". As the scrollable dial 401 is being rotated, the present payment amount set by the user is displayed on the terminal display interface 404 display 909. This value is updated on the display 909 at a refresh rate of 200 ms. This ensures that while the scrolling dial 401 is being rotated, the user is presented with the most current intended payment amount. In this step, the user is also presented with further operating instructions, for instance the instructions "Press dial to confirm payment amount". This ensures that the user is informed of what he or she is required to do next after he or she completes setting the desired payment amount.

Once the desired payment amount is set by the user, in a step 1504, the user depresses the scrollable dial 401 to confirm the amount on the mobile payment terminal 401. Upon detecting the payment amount confirmation via the scrollable dial 401 button press, the illumination on the display 909 changes colour, for instance to the colour green. This advantageously indicates to the user that the mobile payment terminal 400 acknowledges the payment amount confirmation. In this step, the user is also presented with status information, for instance the information "Terminal ready to receive contactless payment".

In a next step 1505, the user sees the contactless payment indicator logo 411 located on the housing of the short distance contactless radio frequency interface 403 light up to indicate to the user that the mobile payment terminal is ready to proceed with the contactless payment transaction. In this step, in conjunction with the contactless payment indicator logo 411 lighting up, user may also see on the display 909 may display of a timer, for instance counting down from Y seconds. Advantageously, this can be used to give an indication to the user how much time he or she presently has left to present a contactless payment device to the short distance contactless radio frequency interface 403. In a step 1506, the user presents the contactless payment device, for instance, a contactless payment card to the short distance contactless radio frequency interface 403.

Upon detection of the contactless payment device by the mobile payment terminal 400, the user is presented with further status information, for instance the information "Transaction in progress" in a step 1507. In this step, upon completion of the "off-line" payment transaction, the user is presented with yet further status information, for instance the information "Transaction completed". In this step, the user sees the illumination on the display 909 also change colour, for instance to the colour red to indicate to the user that the payment transaction is complete. Finally, in step 1508, the user witnesses the mobile payment terminal also emit for instance a "beep" tone as an audio cue via the tone generator 912 as an alternative indicator to the user that the contactless payment transaction is complete.

FIG. 13 and FIG. 15 above relates to the operation of the mobile payment terminal 400 as in FIG. 4 and the user's experience when operating the mobile payment terminal 400 as in FIG. 4 respectively. The flowcharts in FIGS. 13 and 15 can equally be applied to the mobile payment terminal 600 and the mobile payment terminal 700 in FIG. 6 and FIG. 7 respectively.

When applying the flowchart in FIG. 13 to describe the operation of the mobile payment terminal 600 in FIG. 6, in step 1303, the operating instructions displayed on the display 909 may for instance read "Slide adjuster to select payment amount". In steps 1304 and 1314 the flowchart should for instance read "Adjuster knob adjusted" instead of "Scroll dial turned". In step 1307 the flowchart should for instance read "Adjuster knob pressed" instead of "Scroll dial pressed". In step 1306, the operating instructions displayed on the display 909 may for instance read "Press adjuster knob to confirm payment amount".

When applying the flowchart in FIG. 15 to describe the user's experience when using the mobile payment terminal 600 in FIG. 6, in step 1502, the user should read "Slide adjuster to select payment amount". In step 1503, the user should read "Press adjuster knob to confirm payment amount".

When applying the flowchart in FIG. 13 to describe the operation of the mobile payment terminal 700 in FIG. 7, in step 1303, the operating instructions displayed on the display 909 may for instance read "Adjust –/+ buttons to select payment amount". In steps 1304 and 1314 the flowchart should for instance read "–/+ buttons pressed" instead of "Scroll dial turned". In step 1307 the flowchart should for instance read "OK button pressed" instead of "Scroll dial pressed". In step 1306, the operating instructions displayed on the display 909 may for instance read "Press OK button to confirm payment amount".

When applying the flowchart in FIG. 15 to describe the user's experience when using the mobile payment terminal 600 in FIG. 6, in step 1502, the user should read "Adjust –/+ buttons to select payment amount". In step 1503, the user should read "Press OK button to confirm payment amount".

The scrollable dial 401 outer surface 406 of the mobile payment terminal 400 may be textured and coated with or formed of a rubberised material. The advantage of this is to provide mechanical advantage or grip for the user when the scrollable dial 401 is manipulated.

The scrollable dial 401 may also comprise a resilient spring use to apply variable force on the scrollable dial 401 when it is being rotated. The advantage of this is that it provides useful feedback to the user during operation of the scrollable dial 401.

The scrollable dial 401 may also comprise a variable input mean such that its output, for instance a resistance value, to the processor 901 varies in a non-linear fashion when the scrollable dial 401 is rotated. An advantage of this is that the mobile payment terminal 400 can be operated such that when the user is setting the desired payment on the terminal, the payment incremental steps can be varied depending on the rotation angle displacement of the scrollable dial 401 from its original position. Here, the greater the displacement from the centre point, the further the rate of change of the payment value that is displayed before selection. This allows the user to very quickly arrive at the desired payment amount setting.

The mobile payment terminal 100 may be realised such that it can be operated wirelessly with a base station located in the restaurant premises within a fixed radius. The base station will comprise a network communication interface to connect to an acquirer owned terminal via for instance a fixed line telephone or land line. In these embodiments, the transfer of payment transaction information from the merchant/retailer to the acquirer is carried out centrally by the base station only at the end of the day. The advantage of this is that the mobile payment terminal 100 can be simplified and will not require a network communication interface 804, saving cost and complexity. Further, if multiple mobile payment terminals 100 are being used at the same time, multiple dial-in to the acquirer which could lead to connection issues and hence delay to the payment process, can be avoided.

In further embodiments, the mobile payment terminal 100 may also print out a hard copy receipt of the contactless payment transaction for the user as reference. The receipt may contain payment transaction information, for instance an identity of the merchant, the payment amount and a time stamp of the transaction.

Alternatively or in addition, the mobile payment terminal 100 may provide a digital receipt of the contactless payment transaction to the user. For instance, the mobile payment terminal 100 may be equipped with NFC facilities to allow a Bluetooth connection to be established between the mobile payment terminal 100 and the contactless payment devices provided by the user such as a mobile phone. Once connection is established, the digital receipt can then be sent wireless from the mobile payment terminal 100 to the mobile phone.

Although in the above embodiments radar technology is used for contactless gesture detection, another contactless technology may be used instead. For instance, in some embodiments the means for detecting gestures may comprise a camera system to facilitate optical detection of gestures. The gestures may be detected by analysis of a series of consecutively captured images. The analysis consecutive images allows objects and their motion to be detected. The analysis may involve tracking movement of specific components (e.g. fingers) and/or detecting the shape into which the user has placed their hand. The analysis may also involve detecting head movements. The camera may include one camera, or it may include two cameras in a stereoscopic arrangement, for improved gesture detection and recognition. An optical system may be used to detect the same gestures as discussed above in relation to radar-based gesture detection. In other embodiments, ultrasonic sensing may be used for gesture detection. A suitable ultrasonic sensing system is for instance described in Micro Hand Gesture Recognition System Using Ultrasonic Active Sensing by Sang et—Digital Object Identifier 10.1109/ACCESS.2018.2868268, the contents of which are incorporated herein by reference.

The system is configured such as to allow customers/users to provide ratings or reviews. Here, the payment card or token is linked by the user to a platform or a merchant. For instance, the user may link their payment card or token to a review aggregator such as TripAdvisor or Google Reviews (examples of platforms) by registering their payment card or token with the platform.

The registration of the payment card or token with the platform is communicated to the card scheme who operates the transaction server 1004 and/or the card issuer who operates the transaction server 1005. The registration of the payment card or token with the platform may also be communicated with the merchant/retailer who operates the mobile payment terminal 1002 and/or the acquirer who operates the acquirer owned terminal 1003.

Operation will be described with reference to the flow chart of FIG. 16 and the user interface displays of FIG. 17.

Once the contactless payment card or token has been read by the short distance contactless radio frequency interface 103, it is determined whether the payment card or token is linked to a platform or a merchant. The determination depends on where the information concerning linking of the payment card or token to the platform or merchant is stored. If the linking information is stored by the merchant/retailer who operates the mobile payment terminal 1002, then the determination can be performed quickly by checking data in a database operated by the merchant/retailer. If the linking information is stored by the card scheme who operates the transaction server 1004, the card issuer who operates the transaction server 1005, or the acquirer who operates the acquirer owned terminal 1003 then the determining involves transmitting information allowing the payment card or token to that other entity and performing a database check at that other entity.

If it is determined that the payment card or token is so linked to a platform or a merchant, then the operation starts at step 1601. This step may follow step 1213 of FIG. 12 or it may be in place of it. At step 1602, mobile payment terminal 100 provides a display 1701 in which is included the text 'Leave a review' and a graphic showing the user what gesture to provide. At step 1603, the mobile payment terminal 100 checks for an adjust review gesture input. Upon receiving an adjust review gesture input a time out timer A is started 1604. The time out period for time out A timer may for instance be set at 10 seconds. Once time out A timer is started the operation then progresses to step 1605, where the rating is adjusted by the mobile payment terminal 100. The rating may be displayed in the form of a star rating scale, with a currently selected rating being communicated by highlighting one of the stars compared to the other stars, as shown in display 1702. The review rating is constantly updated by the processor 901 on the display 909 as the gestures from the user are detected, allowing the user to know what the review rating is currently set at. The display 809 may also display further user instructions, for instance, the text 'Thumbs up to confirm' and a graphic showing the user what gesture to provide to confirm the review, as shown in display 1703.

At 1606 it is determined whether the adjust gesture has ended. This may be detected for instance by detecting movement of the user's hand to a confirmation gesture. At 1610 the mobile payment terminal waits to detect a gesture. If a change value gesture is detected then it is determined that the user is continuing to determine a value and the operation progresses to 1611 where the time out timer A is reset. If no gesture is detected at 1606 or 1610 and time out time A reaches its predetermined time out limit then the operation progresses back to step 1602. On a positive determination of a confirmation gesture at 1606, the operation progresses to step 1607, where the terminal displays an indication that the selected review rating has been confirmed, as shown in display 1704. The review is then processed at 1608. Finally, at 1609 the terminal returns to the standby mode 1201.

Figure 16:
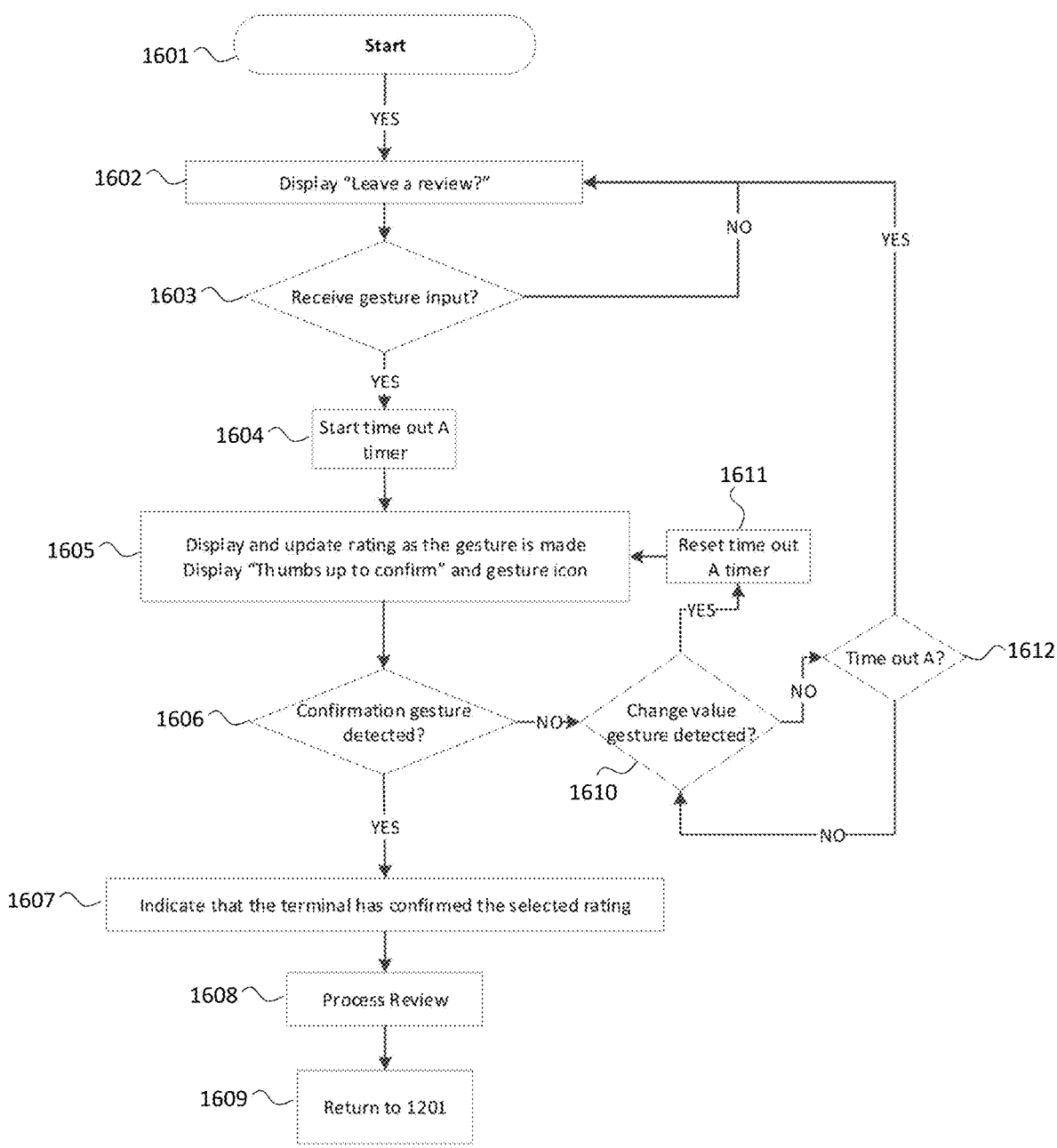
FIG. 16 is a flow chart showing further operation of the FIG. 1 mobile payment terminal according to embodiments of the disclosure.
Figure 17:
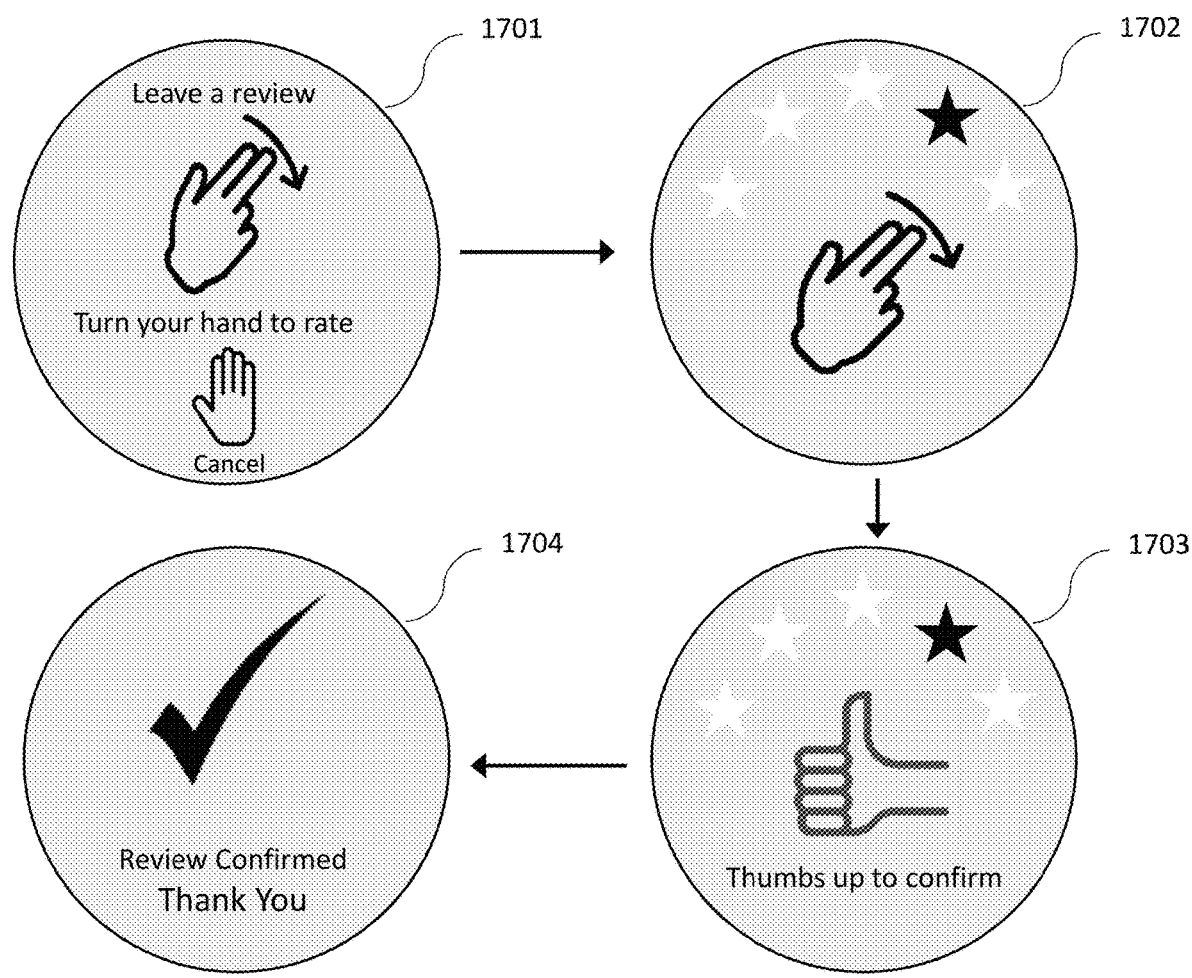
FIG. 17 is a flow chart showing a user experience of the FIG. 1 mobile payment terminal during a further operation according to embodiments of the disclosure.

At any point in the operation illustrated by FIG. 16, the operation may be cancelled. The operation may be cancelled by detection of a cancellation gesture, for example moving a hand up such that the palm is facing the mobile terminal 100. The terminal may display instructions in addition to a graphic showing the user what gesture to perform, as shown in display 1701. Upon cancellation the terminal may return to the standby mode 1201.

In some embodiments the terminal 100 may display a QR code at the end of a transaction, for example at step 1213. The QR code may be used as an alternate method of leaving a review by linking the user to a review webpage, for example a review platform webpage (such as Tripadvisor or Trustpilot). The QR code may also direct a user to a company or charity webpage to provide additional information or offers or like to a social media platform (such as Facebook or Twitter) to share information about the transaction. Other machine-readable codes or images may be used in place of a QR code, for example Microsoft Tags or SnapTags or barcodes.

The invention claimed is:
1. Apparatus comprising:
   a contactless payment transceiver;
   a display;
   a non-contact user input device configured for detecting a predefined gesture of a user corresponding to a select input, a predefined gesture of a user corresponding to an increase input and a predefined gesture of a user corresponding to decrease input, wherein the predefined gesture corresponding to the increase input comprises a gesture of a user rotating a hand in a first direction and the predefined gesture corresponding to the decrease input comprises a gesture of the user rotating the hand in a second direction opposite to the first direction;
   a processor arrangement; and
   a non-transient memory storing computer code which when executed by the processor arrangement causes the apparatus to:
      display an initial numerical value on the display;
      respond to detecting the gesture corresponding to the increase input by incrementing the numerical value displayed on the display;

respond to detecting the gesture corresponding to the decrease input by decrementing the numerical value displayed on the display;

respond to detecting the gesture corresponding to the select input by setting a transaction amount that corresponds to the numerical value displayed on the display at the time of detection of the gesture corresponding to the select input; and use the contactless payment transceiver to initiate execution of a transaction for the transaction amount with a contactless payment token.

2. Apparatus as in claim 1, wherein the non-contact user input device comprises a radar sensor.

3. Apparatus as in claim 2, wherein the radar sensor is a Frequency Modulated Continuous Wave (FMCW) radar sensor.

4. Apparatus as in claim 2, wherein the radar sensor is a Direct-Sequence Spread Spectrum (DSSS) radar sensor.

5. Apparatus as in claim 1, wherein the gesture corresponding to the select input comprises a gesture of the user gripping the hand with a thumb of the hand extended.

6. Apparatus as in claim 1, wherein the memory stores computer code which when executed by the processor arrangement causes the apparatus to:

respond to detecting a gesture corresponding to a cancellation input by cancelling the transaction without initiating execution of a transaction for the transaction amount with a contactless payment token.

7. Apparatus as in claim 1, wherein the gesture corresponding to the decrease input comprises a gesture of the user holding an open palm of the hand towards the apparatus.

8. Apparatus as in claim 1, wherein the memory stores computer code which when executed by the processor arrangement causes the apparatus to:

display an indicator that the transaction is complete.

9. Apparatus as in claim 1, wherein the memory stores computer code which when executed by the processor arrangement causes the apparatus to:

enter standby mode following completion of a transaction, and respond to detection by the non-contact user input device of the presence of a user by exiting standby mode.

10. Apparatus as in claim 1, wherein the memory stores computer code which when executed by the processor arrangement causes the apparatus to:

provide a user interface allowing a user to enter a rating or review.

11. Apparatus as in claim 10, wherein the memory stores computer code which when executed by the processor arrangement causes the apparatus to:

provide the user interface allowing the user to enter the rating or review to a platform with which the payment card is registered.

12. Apparatus as in claim 10, wherein the memory stores computer code which when executed by the processor arrangement causes the apparatus to:

provide the user interface allowing the user to enter the rating or review in response to reading the contactless payment token.

13. Apparatus as in claim 12, wherein the memory stores computer code which when executed by the processor arrangement causes the apparatus to:

determine whether the contactless payment token is linked to a review platform or a merchant in response to reading the contactless payment token.

14. Apparatus as in claim 10, wherein the memory stores computer code which when executed by the processor arrangement causes the apparatus to:

adjust a displayed rating in response to detecting a rating change gesture using the non-contact user input device.

15. Apparatus as in claim 14, wherein the memory stores computer code which when executed by the processor arrangement causes the apparatus to:

display an indication that the selected review rating has been confirmed in response to detecting a rating confirmation gesture using the non-contact user input device.

16. Apparatus as in claim 14, wherein the memory stores computer code which when executed by the processor arrangement causes the apparatus to:

after completing a transaction, display a machine-readable code, barcode or QR code linking the user to a review webpage.

17. The apparatus of claim 1, wherein the size of the increment when increasing or decreasing the numerical value is dependent an extent of deflection of the user's hand from a detected starting position.

18. The apparatus of claim 2, wherein the apparatus is configured to recognize the predefined gesture of a user corresponding to the select input, the predefined gesture of a user corresponding to the increase input, and the predefined gesture of the user corresponding to the decrease input based on received radar data.

19. The apparatus of claim 1, wherein the display is configured to display one or more user instructions with corresponding gesture logos and/or instructional gesture animations illustrating: the predefined gesture corresponding to the select input, the predefined gesture corresponding to the increase input, and the predefined gesture corresponding to the decrease input.

20. A method comprising:

displaying an initial numerical value on a display;

responding to a non-contact user input device detecting a predefined gesture corresponding to an increase input by incrementing the numerical value displayed on the display;

responding to the non-contact user input device detecting a predefined gesture corresponding to the decrease input by decrementing the numerical value displayed on the display;

responding to the non-contact user input device detecting a predefined gesture corresponding to a select input by setting a transaction amount that corresponds to the numerical value displayed on the display at the time of detection of the gesture corresponding to the select input, wherein the predefined gesture corresponding to the increase input comprises a gesture of a user rotating a hand in a first direction and the predefined gesture corresponding to the decrease input comprises a gesture of the user rotating the hand in a second direction opposite to the first direction; and using a contactless payment transceiver, initiating execution of a transaction for the transaction amount with a contactless payment token.

\* \* \* \* \*